(12) United States Patent
Noda

(10) Patent No.: US 8,747,766 B2
(45) Date of Patent: Jun. 10, 2014

(54) HYDROGEN SEPARATION MEMBRANE AND PERMSELECTIVE MEMBRANE REACTOR

(75) Inventor: Kenichi Noda, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 949 days.

(21) Appl. No.: 12/622,546

(22) Filed: Nov. 20, 2009

(65) Prior Publication Data

US 2010/0092353 A1 Apr. 15, 2010

Related U.S. Application Data

(63) Continuation of application No. PCT/JP2008/060595, filed on Jun. 10, 2008.

(30) Foreign Application Priority Data

Jun. 11, 2007 (JP) .................................. 2007-154326

(51) Int. Cl.
| | |
|---|---|
| B01J 35/02 | (2006.01) |
| B01J 8/02 | (2006.01) |
| B01J 19/00 | (2006.01) |
| B01J 7/02 | (2006.01) |
| B01J 33/00 | (2006.01) |
| B01J 20/28 | (2006.01) |
| B01J 35/00 | (2006.01) |
| B01D 50/00 | (2006.01) |
| B01D 53/34 | (2006.01) |
| B01D 53/22 | (2006.01) |
| B01D 59/12 | (2006.01) |

(52) U.S. Cl.
USPC ........... 422/211; 422/129; 422/168; 422/177; 422/178; 422/179; 422/180; 422/181; 422/222; 422/239; 96/4; 96/10; 96/11; 95/43; 95/45; 95/55; 95/56; 502/1; 502/2; 502/4

(58) Field of Classification Search
USPC ......... 422/129, 211, 222, 168, 177–181, 239; 96/4, 10, 11; 95/43, 45, 55, 56; 502/1, 502/2, 4
See application file for complete search history.

(56) References Cited

U.S. PATENT DOCUMENTS

| | | | |
|---|---|---|---|
| 3,155,467 | A | 11/1964 | Yamamoto et al. |
| 3,350,845 | A | 11/1967 | McKinley |

(Continued)

FOREIGN PATENT DOCUMENTS

| | | | |
|---|---|---|---|
| EP | 2213985 | A | 8/1974 |
| FR | 2213985 | A | 8/1974 |

(Continued)

OTHER PUBLICATIONS

Paglieri et al., Innovations in Palladium Membrane Research, 2002, Separation & Purification Reviews, 3:1, 1-169.*

(Continued)

*Primary Examiner* — Natasha Young
(74) *Attorney, Agent, or Firm* — Burr & Brown, PLLC

(57) ABSTRACT

A hydrogen separation membrane comprising a palladium alloy that includes at least palladium, an added metal A, and an added metal B, the added metal A and the added metal B being two different metals other than palladium, each of the added metal A and the added metal B forming a complete solid solution with palladium, and the added metal A and the added metal B having a triple point in an equilibrium diagram and not forming an intermetallic compound. The hydrogen separation membrane exhibits excellent hydrogen permeability and durability.

5 Claims, 17 Drawing Sheets

(56) References Cited

U.S. PATENT DOCUMENTS

| | | | |
|---|---|---|---|
| 3,439,474 A | 4/1969 | McKinley | |
| 3,804,616 A * | 4/1974 | Goltsov et al. | 420/465 |
| 4,342,738 A * | 8/1982 | Burgund | 204/157.5 |
| 5,376,167 A | 12/1994 | Broutin et al. | |
| 5,614,001 A | 3/1997 | Kosaka et al. | |
| 5,931,987 A | 8/1999 | Buxbaum | |
| 6,372,363 B1 * | 4/2002 | Krueger | 428/606 |
| 7,622,086 B2 * | 11/2009 | Takahashi et al. | 422/502 |
| 7,655,183 B2 * | 2/2010 | Benn et al. | 420/463 |
| 8,101,243 B2 * | 1/2012 | Way et al. | 427/404 |
| 8,226,751 B2 * | 7/2012 | Ishibe et al. | 96/11 |
| 2004/0187690 A1 * | 9/2004 | Suzuki | 96/10 |
| 2006/0269471 A1 * | 11/2006 | Takahashi et al. | 423/651 |
| 2008/0213142 A1 | 9/2008 | Katsurayama et al. | |

FOREIGN PATENT DOCUMENTS

| | | |
|---|---|---|
| JP | 05-330803 A1 | 12/1993 |
| JP | 08-0388863 A1 | 2/1996 |
| JP | 08-318142 A1 | 12/1996 |
| JP | 2001-046845 A1 | 2/2001 |
| JP | 3377731 B2 | 12/2002 |
| JP | 2005-254191 A1 | 9/2005 |
| JP | 2007-070165 A1 | 3/2007 |
| WO | WO 2005/070519 A1 * | 8/2005 |
| WO | WO 2006/031080 A1 * | 3/2006 |
| WO | WO 2007/040034 A1 * | 4/2007 |
| WO | WO 2007/078278 A2 * | 7/2007 |

OTHER PUBLICATIONS

Gerhard L. Holleck, "*Diffusion and Solubility of Hydrogen in Palladium and Palladium-Silver Alloys*," The Journal of Physical Chemistry, vol. 74, No. 3, Feb. 5, 1970, pp. 503-511.

John Piper, "*Diffusion of Hydrogen in Copper-Palladium Alloys*," Journal of Applied Physics, vol. 37, No. 2, Feb. 1966, pp. 715-721.

A.A. Rodina et al., "*The Interaction of Hydrogen with Certain Palladium-Gold and Palladium-Silver-Gold Alloys*," Russian Journal of Physical Chemistry, vol. 45, No. 5, 1971, pp. 621-623.

D. Fort et al., "*A Comparison of Palladium-Silver and Palladium-Yttrium Alloys as Hydrogen Separation Membranes*," Journal of the Less-Common Metals, vol. 39, 1975, pp. 293-308.

Shin-Kun Ryi et al., "*Characterization of Pd-Cu-Ni Ternary Alloy Membrane Prepared by Magnetron Sputtering and Cu-Reflow on Porous Nickel Support for Hydrogen Separation*," Separation and Purification Technology, vol. 50, No. 1, Jun. 2006, pp. 82-91.

* cited by examiner

RAW MATERIAL GAS

HYDROGEN SEPARATION MEMBRANE AND PERMSELECTIVE MEMBRANE REACTOR

BACKGROUND OF THE INVENTION

1. Field of the Invention

The present invention relates to a hydrogen separation membrane and a selectively permeable membrane reactor. More particularly, the present invention relates to a hydrogen separation membrane that exhibits excellent hydrogen permeability and durability, and a selectively permeable membrane reactor using the hydrogen separation membrane.

2. Description of Related Art

A large amount of hydrogen gas has been used as a petrochemical basic material gas. Hydrogen gas has also attracted attention as a clean energy source. Hydrogen gas used for such purposes is produced from hydrocarbons (e.g., methane, propane, butane, or kerosene) or oxygenated hydrocarbons (e.g., methanol) as a main raw material gas by utilizing a reforming reaction, a partial oxidation reaction, an self-heating reaction, a decomposition reaction, or the like. Hydrogen gas is also produced by subjecting by-product carbon monoxide and water to a shift reaction. Hydrogen thus produced can be separated and collected by utilizing a selectively permeable membrane (e.g., palladium alloy membrane) that selectively allows hydrogen to pass through, for example.

As such a separation membrane, a hydrogen separation membrane formed using palladium or a palladium alloy that contains palladium and another metal (e.g., silver, copper, gold, or a rare earth element) has been used (see Patent Documents 1 to 5 and Non-patent Documents 1 to 4, for example). Such a hydrogen separation membrane is produced so that the entire membrane is formed of an almost uniform palladium alloy from the viewpoint of the production method.

Patent Document 1: U.S. Pat. No. 3,439,474
Patent Document 2: U.S. Pat. No. 3,350,845
Patent Document 3: Japanese Patent No. 3377731
Patent Document 4: JP-A-2001-46845
Patent Document 5: U.S. Pat. No. 3,155,467
Non-patent Document 1: J. Phys. Chem., 74 (1970), pp. 503-511
Non-patent Document 2: J. Appl. Phys., 37 (2) (1966), pp. 715-721
Non-patent Document 3: Russ. J. Phys. Chem., 45 (1971), pp. 621-623
Non-patent Document 4: J. Less-Common Metals 39 (1975), pp. 293-308

SUMMARY OF THE INVENTION

A hydrogen separation membrane formed using palladium or a palladium alloy that contains palladium and another metal may suffer from formation or growth of defects during use at a high temperature (i.e., the separation membrane exhibits poor durability).

When the thickness of the hydrogen separation membrane is increased to suppress formation of defects, the hydrogen permeability of the separation membrane decreases.

Specifically, an improvement in hydrogen permeability and an improvement in durability of a separation membrane formed using palladium or a palladium alloy have a trade-off relationship. It has been very difficult to achieve excellent hydrogen permeability and durability at the same time.

The present invention was conceived in view of the above problems. An object of the present invention is to provide a hydrogen separation membrane that is provided with excellent durability in addition to excellent hydrogen permeability by suppressing formation or growth of defects, and a selectively permeable membrane reactor using the hydrogen separation membrane.

The inventor of the present invention conducted extensive studies in order to achieve the above object. As a result, the inventor found that the above object can be achieved by a hydrogen separation membrane that is formed using a palladium alloy that contains palladium and two or more metals having specific solid solubility. This finding has led to the completion of the present invention.

According to the present invention, the following hydrogen separation membrane and selectively permeable membrane reactor are provided.

[1] A hydrogen separation membrane comprising a palladium alloy that includes at least palladium, an added metal A, and an added metal B, the added metal A and the added metal B being two different metals other than palladium, each of the added metal A and the added metal B forming a complete solid solution with palladium, and the added metal A and the added metal B having a triple point in an equilibrium diagram and not forming an intermetallic compound.

[2] The hydrogen separation membrane according to [1], wherein the palladium alloy has been heat treated at a temperature within ±100° C. of the triple point of the added metal A and the added metal B in the equilibrium diagram.

[3] The hydrogen separation membrane according to [1] or [2], wherein each of the added metal A and the added metal B is selected from the transition metals of Groups 9 to 11 on the periodic table.

[4] The hydrogen separation membrane according to any of [1] to [3], wherein the added metal A or the added metal B is silver.

[5] The hydrogen separation membrane according to any of [1] to [3], wherein the added metal A or the added metal B is gold.

[6] The hydrogen separation membrane according to any of [1] to [3], wherein the added metal A or the added metal B is copper.

[7] The hydrogen separation membrane according to any of [1] to [3], wherein the added metal A or the added metal B is iridium.

[8] The hydrogen separation membrane according to any of [1] to [3], wherein the added metal A or the added metal B is rhodium.

[9] The hydrogen separation membrane according to any of [1] to [3], wherein the added metal A or the added metal B is cobalt.

[10] The hydrogen separation membrane according to any of [1] to [3], wherein the added metal A or the added metal B is nickel.

[11] The hydrogen separation membrane according to any of [1] to [10], wherein the content of palladium in the palladium alloy is 40 to 90 mass %.

[12] The hydrogen separation membrane according to any of [1] to [11], the hydrogen separation membrane having a thickness of 0.1 to 10 μm.

[13] A hydrogen separator comprising: a porous substrate that contains a ceramic or a metal as a main component and has a plurality of pores formed from one surface to another surface of the porous substrate, and the hydrogen separation membrane according to any of [1] to [12] that is disposed on the one surface of the porous substrate.

[14] A selectively permeable membrane reactor comprising: a reaction tube, one end of the reaction tube being a gas inlet and the other end of the reaction tube being a gas outlet; a separation tube that is inserted into the reaction tube and includes a selectively permeable membrane that selectively allows hydrogen to pass through on its surface; and a catalyst that is disposed between the reaction tube and the separation tube and promotes a reaction for producing hydrogen from a raw material gas, the selectively permeable membrane being the hydrogen separation membrane according to any of [1] to [12].

[15] The selectively permeable membrane reactor according to [14], wherein the catalyst is supported on a support formed in the shape of pellets, a foam, or a honeycomb, or formed in the shape of pellets, a foam, or a honeycomb.

The hydrogen separation membrane of the present invention exhibits excellent hydrogen permeability and durability. Specifically, since the element distribution required to improve durability can be implemented by adding the two metals having a specific solid solubility to palladium, defects of the hydrogen separation membrane can be prevented. Therefore, the durability of the hydrogen separation membrane can be improved.

Since the hydrogen separation membrane according to the present invention exhibits excellent durability, the thickness of the hydrogen separation membrane can be reduced so that the amount of palladium used for the hydrogen separation membrane can be reduced. This is advantageous from the viewpoint of cost. Moreover, since the alloy is formed by adding the two metals other than palladium to palladium, the content of palladium in the alloy can be reduced.

Since the selectively permeable membrane reactor according to the present invention utilizes the hydrogen separation membrane according to the present invention, the selectively permeable membrane reactor exhibits excellent hydrogen permeability and durability. Moreover, since the amount of relatively expensive palladium used for the hydrogen separation membrane can be reduced, the reactor can be produced at low cost.

BRIEF DESCRIPTION OF THE DRAWINGS

FIG. 7($b$) illustrates the phase diagram for cobalt and palladium.

FIG. 7($c$) illustrates the phase diagram or nickel and palladium.

FIG. 7($d$) illustrates the phase diagram for iridium and palladium.

FIG. 7($e$) illustrates the phase diagram for palladium and rhodium.

FIG. 8($b$) illustrates the phase diagram for nickel and silver.

FIG. 8($c$) illustrates the phase diagram for silver and iridium.

FIG. 8($d$) illustrates the phase diagram for silver and rhodium.

FIG. 8($e$) illustrates the phase diagram for gold and cobalt.

FIG. 8($f$) illustrates the phase diagram for gold and rhodium.

EXPLANATION OF SYMBOLS

1: selectively permeable membrane reactor, 2: reaction tube, 3: separation tube, 4: catalyst, 10: selectively permeable membrane, 11: substrate, 12: separation section, 13: reaction space, 21: inlet, 22: outlet, 23: outlet (separation outlet), 31: hydrogen separator, 32: porous substrate, 34: one surface, 35: hydrogen separation membrane

DETAILED DESCRIPTION OF THE INVENTION

Preferred embodiments of the present invention are described below. Note that the present invention is not limited to the following embodiments. Various modifications, improvements, and the like may be made of the following embodiments without departing from the scope of the present invention based on the ordinary knowledge of a person skilled in the art.

[1] Hydrogen Separation Membrane

A hydrogen separation membrane according to one embodiment of the present invention is described in detail below. The hydrogen separation membrane according to this embodiment includes a palladium alloy that includes palladium, an added metal A, and an added metal B, the added metal A and the added metal B being two different metals other than palladium, each of the added metal A and the added metal B forming a complete solid solution with palladium, and the added metal A and the added metal B having a triple point in an equilibrium diagram and not forming an intermetallic compound.

According to this configuration, a state in which three metals are non-uniformly distributed or segregated or the like can be created in the palladium alloy. Such controlled non-homogeneity is effective for preventing defects of the hydrogen separation membrane without impairing the hydrogen permeability, so that the durability can be improved. Therefore, the hydrogen separation membrane according to this embodiment exhibits excellent hydrogen permeability and durability.

Since the thickness of the hydrogen separation membrane according to this embodiment can be reduced due to an improvement in durability, the amount of palladium used for the hydrogen separation membrane can be reduced. This is advantageous from the viewpoint of cost. Moreover, since the alloy is formed by adding the added metal A and the added metal B to palladium, the content of palladium in the alloy can be reduced.

[1-1] Palladium Alloy

The palladium alloy used for the hydrogen separation membrane according to this embodiment includes at least palladium, the added metal A, and the added metal B (hereinafter may be simply referred to as "added metals"), the added metal A and the added metal B being two different metals other than palladium.

Each of the two kinds of the added metal A and the added metal B that form the palladium alloy forms a complete solid solution with palladium. The added metal A and the added metal B have a triple point in the equilibrium diagram, and do not form an intermetallic compound.

Figure 6A:
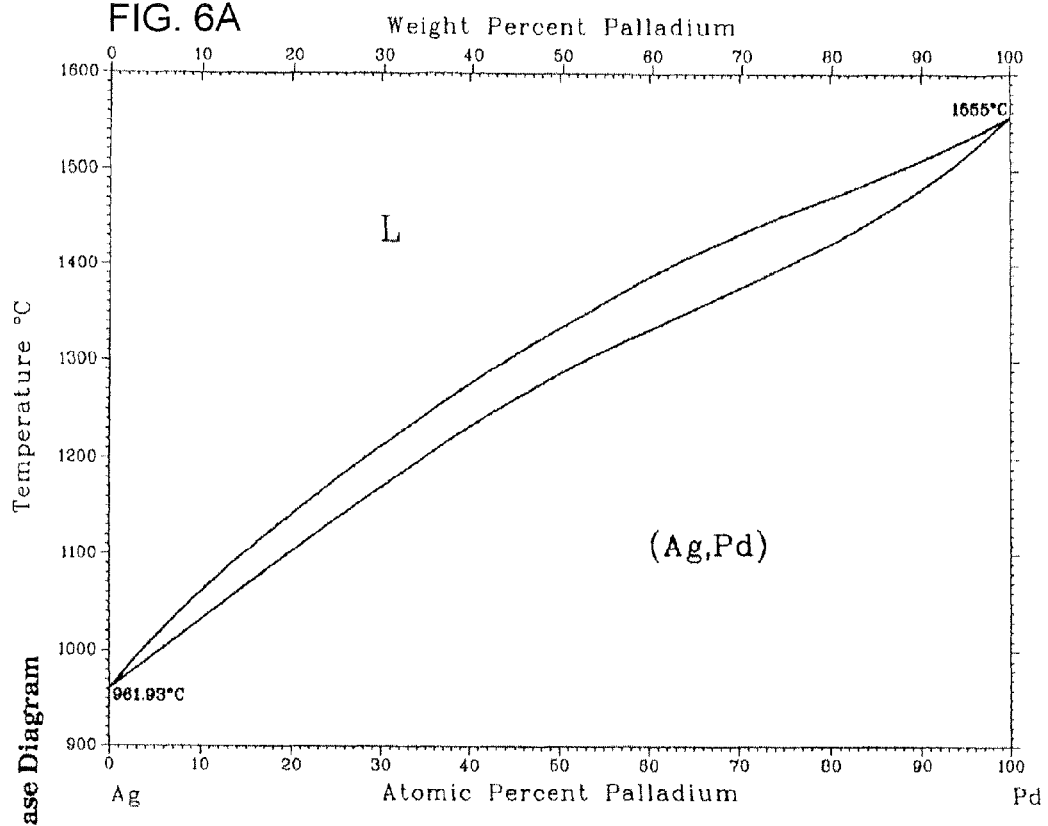
FIG. 6A is an equilibrium diagram for silver (Ag) and palladium (Pd).
Figure 6A:
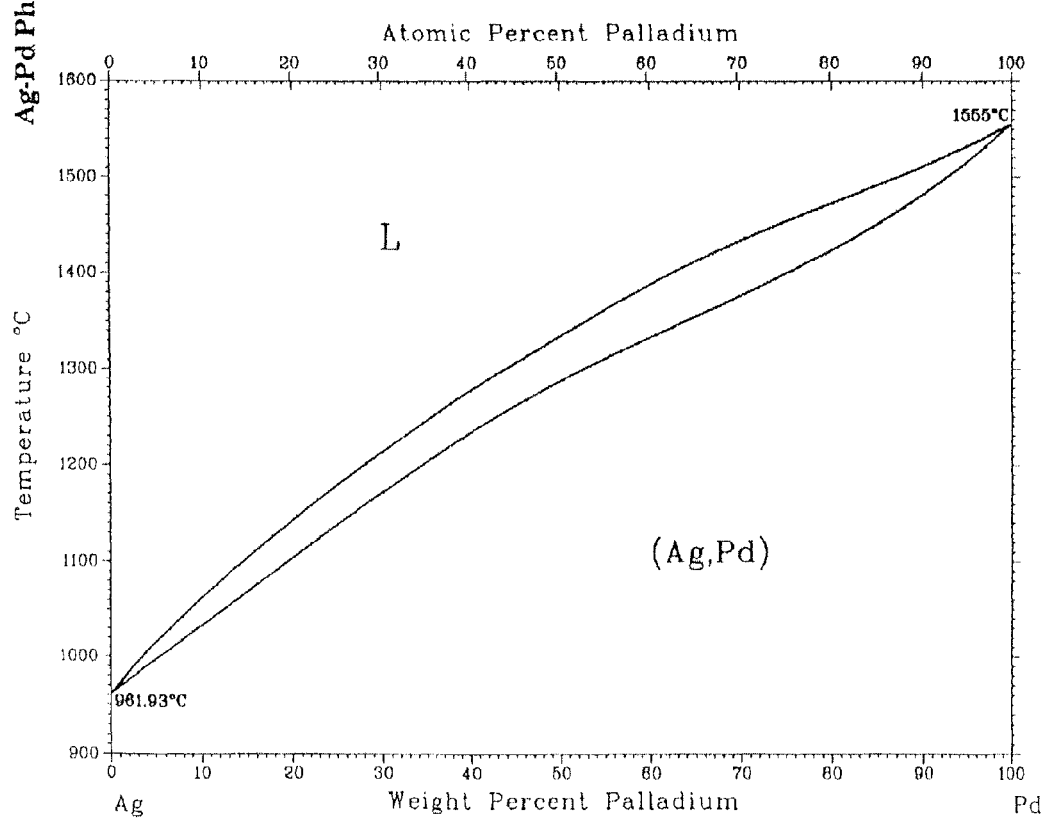
Figure 6B:
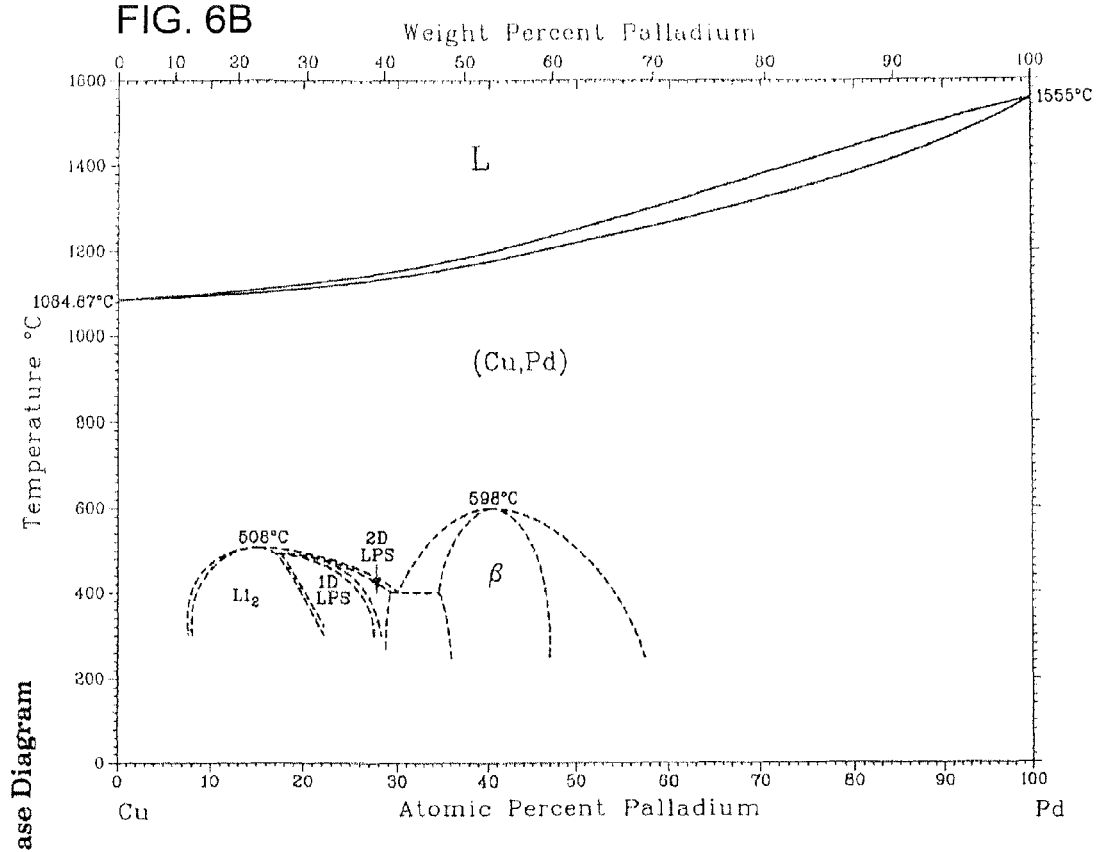
FIG. 6B is an equilibrium diagram for copper (Cu) and palladium (Pd).
Figure 6B:
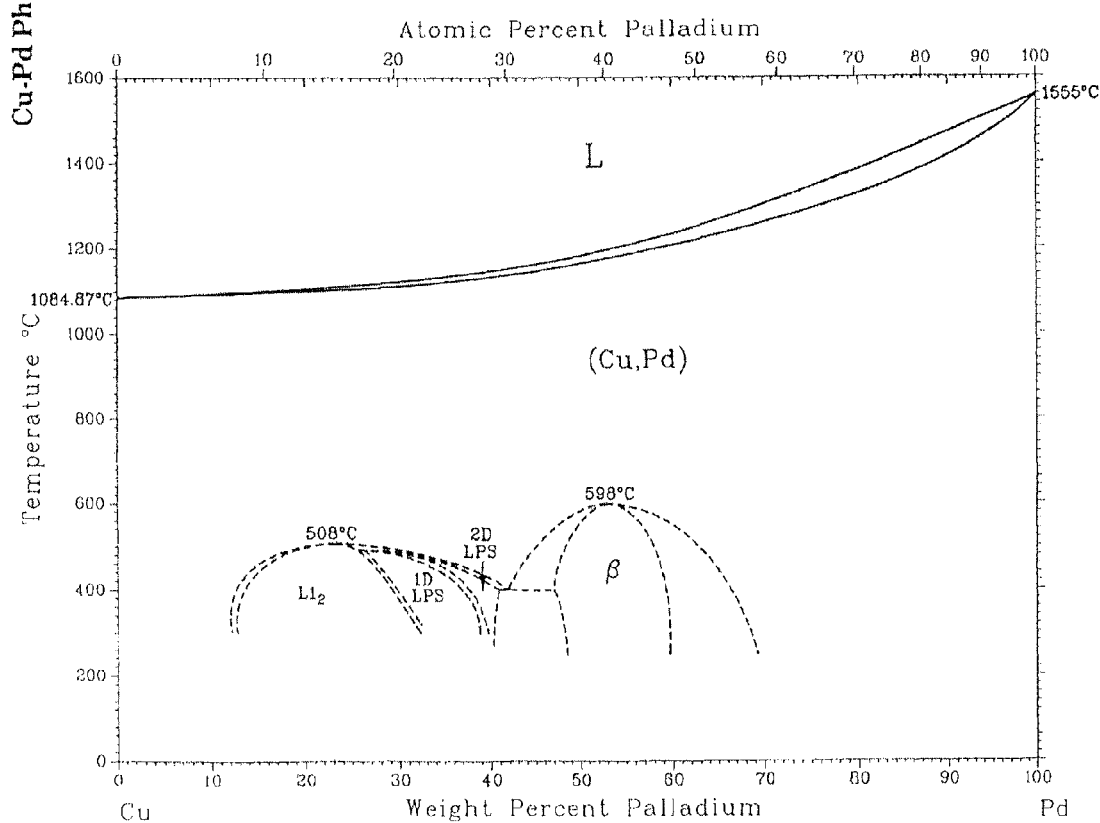

The expression "each of the two kinds of the added metal A and the added metal B forms a complete solid solution with palladium" means that palladium and each added metal are solid soluble in an arbitrary ratio. Specifically, palladium and the added metal A are solid soluble in an arbitrary ratio, and palladium and the added metal B are solid soluble in an arbitrary ratio. For example, FIG. 6A illustrates the phase diagram for silver and palladium and FIG. 6B illustrates the phase diagram for copper and palladium. The phase diagrams for gold and palladium, cobalt and palladium, nickel and palladium, iridium and palladium, and palladium and rhodium are shown in FIGS. 7(a)-7(e), respectively.

The added metal A and the added metal B that differs from the added metal A have a triple point in the equilibrium diagram, and do not form an intermetallic compound. The term "equilibrium diagram" refers to a phase diagram that indicates the temperature and the composition of the two-component system formed of the added metal A and the added metal B under normal pressure in an equilibrium state. The expression "the added metal A and the added metal B have a triple point in the equilibrium diagram" means that the added metal A and the added metal B are not solid soluble in an arbitrary ratio in a solid state (i.e., have limited miscibility). Examples of the triple point of two metals include an eutectic point, a peritectic point, and the like. The term "intermetallic compound" refers to a stable compound that excludes a solid solution and is formed of the added metal A and the added metal B. The ratio of the constituent atoms of the added metal A and the added metal B is an integral ratio. Specifically, the expression "do not form an intermetallic compound" means that a specific compound having an integral ratio is not formed by the added metal A and the added metal B, and separation into two phases occurs at a low temperature when mixing the added metal A and the added metal B in a ratio equal to or more than the solid solubility limit.

Figure 6C:
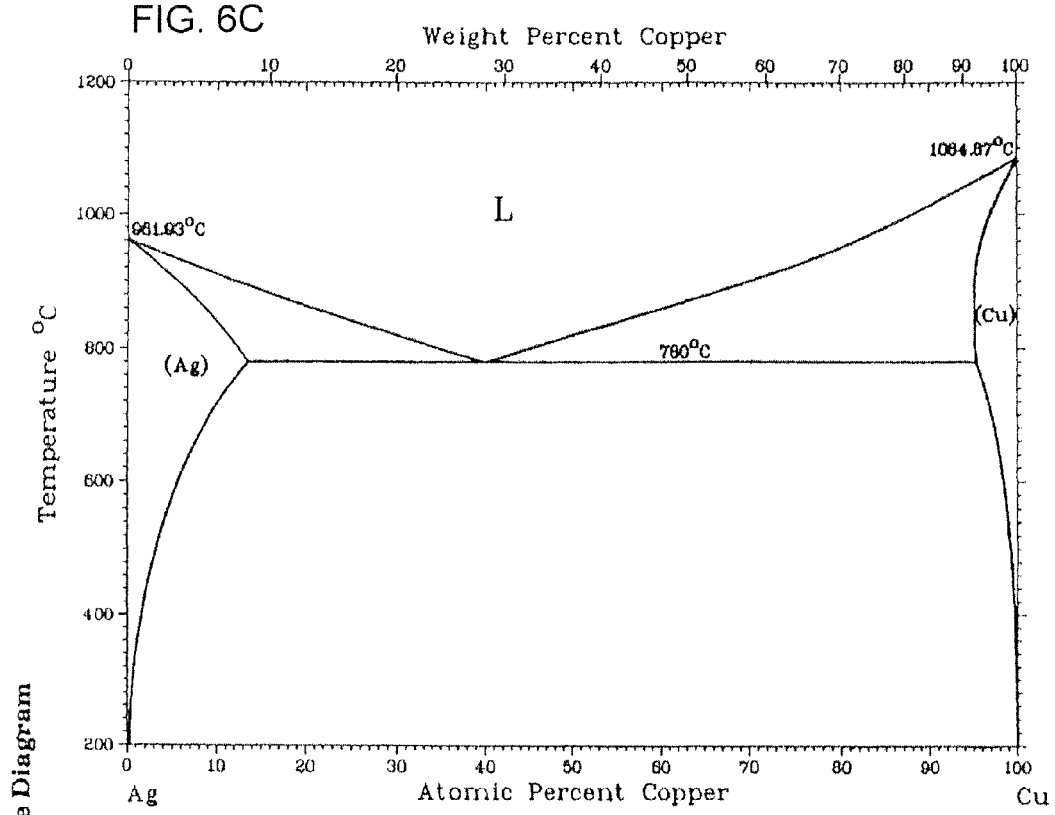
FIG. 6C is an equilibrium diagram for silver (Ag) and copper (Cu).
Figure 6C:
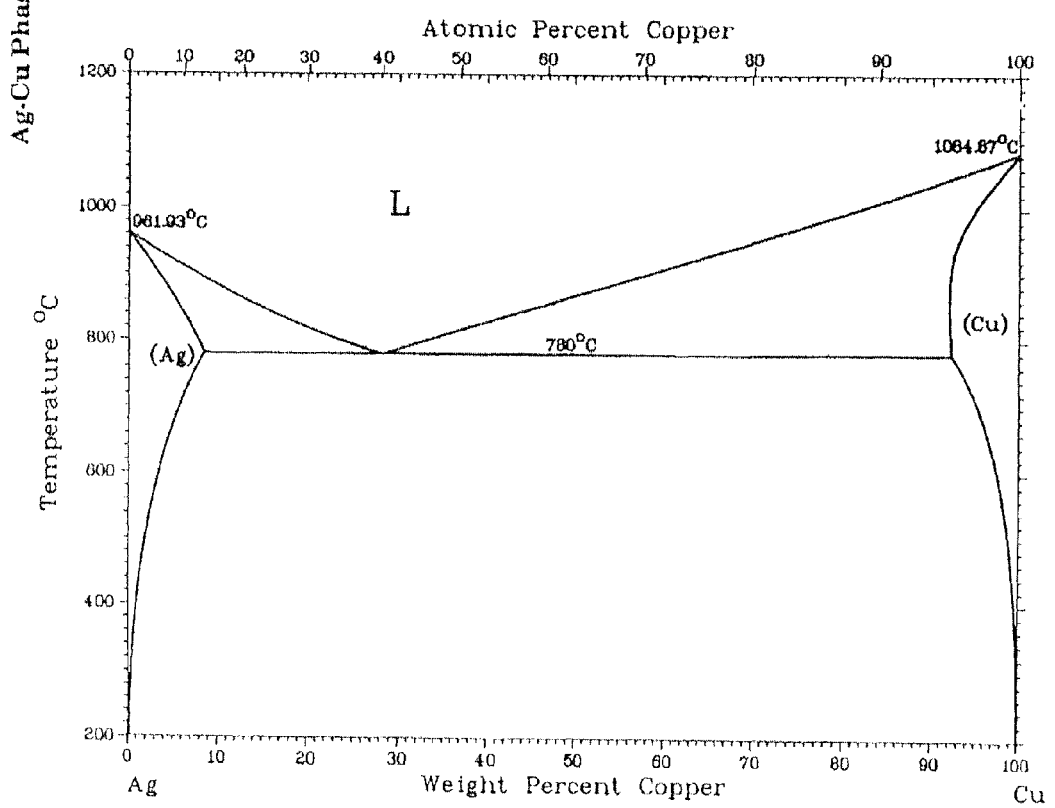
Figure 7A:
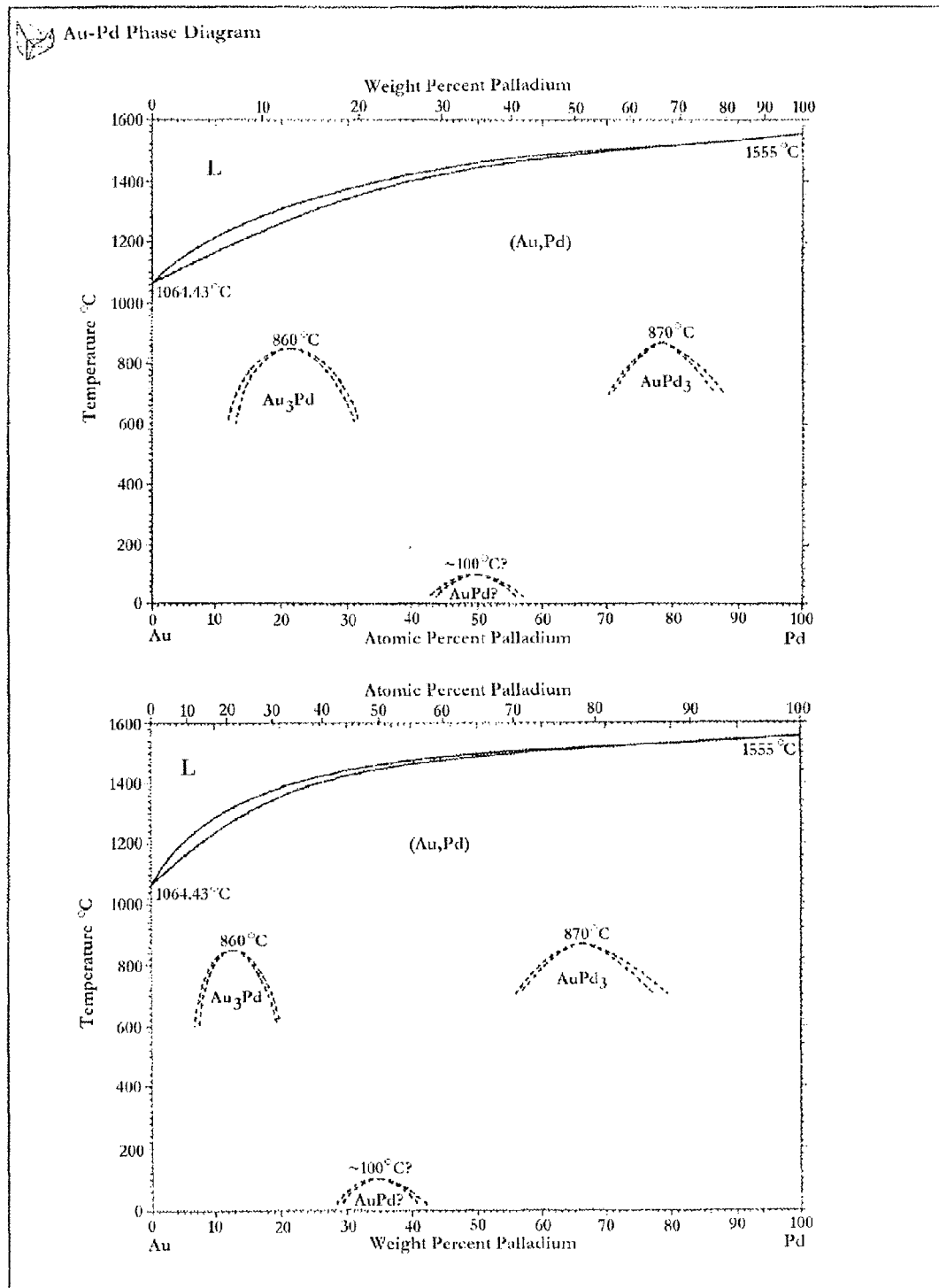
FIG. 7($a$) illustrates the phase diagram for gold and palladium.
Figure 7B:
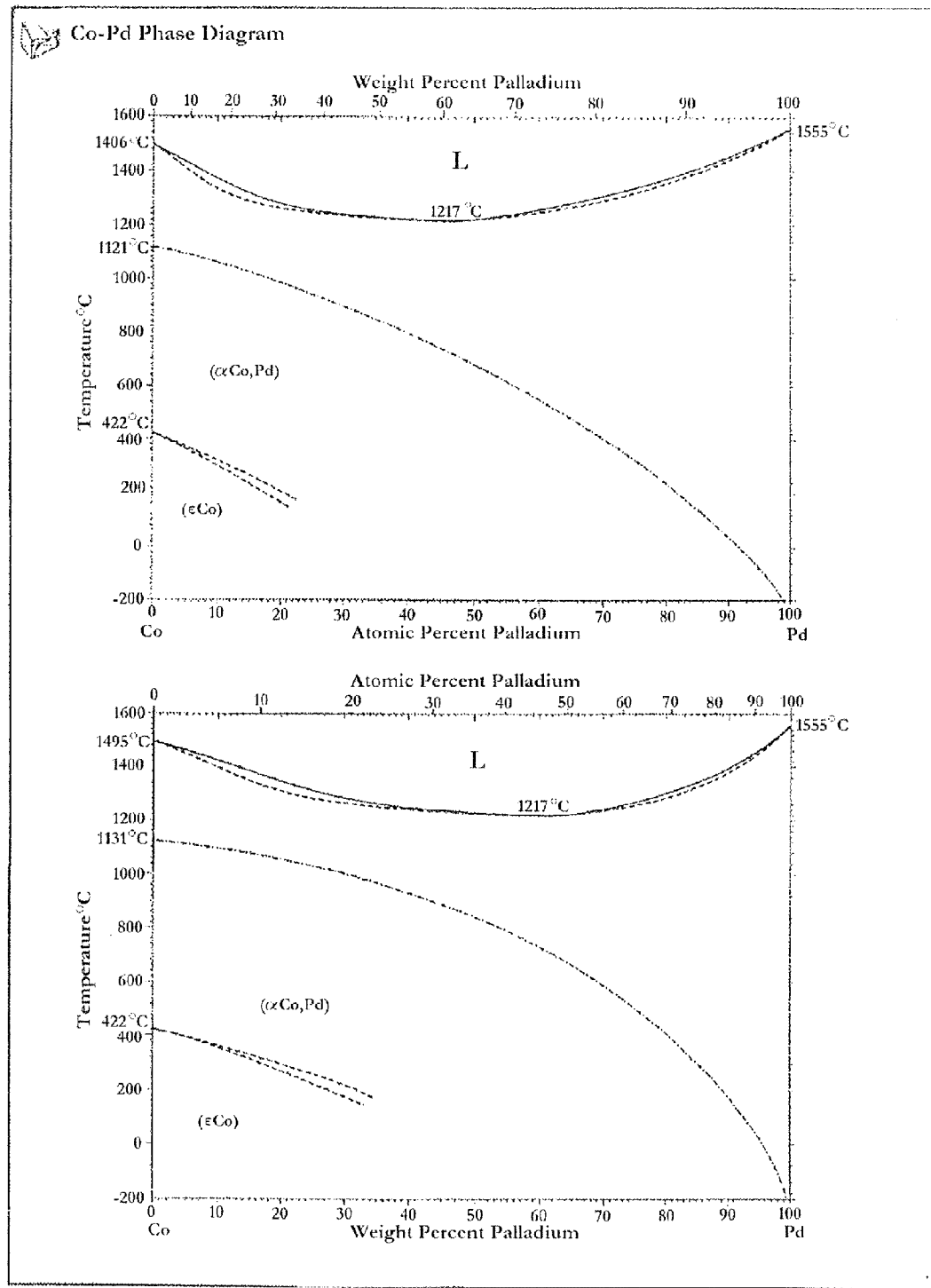
Figure 7C:
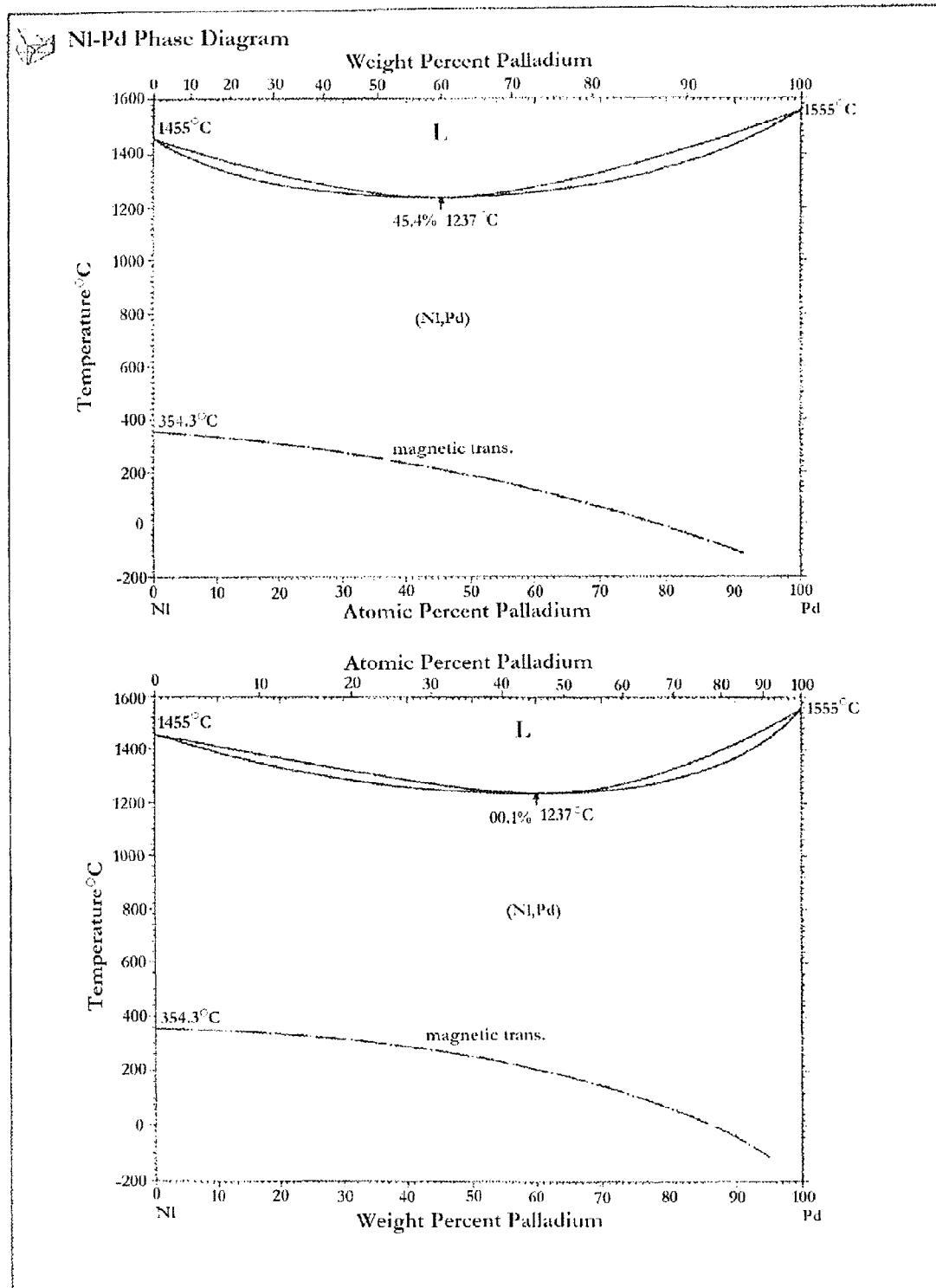
Figure 7D:
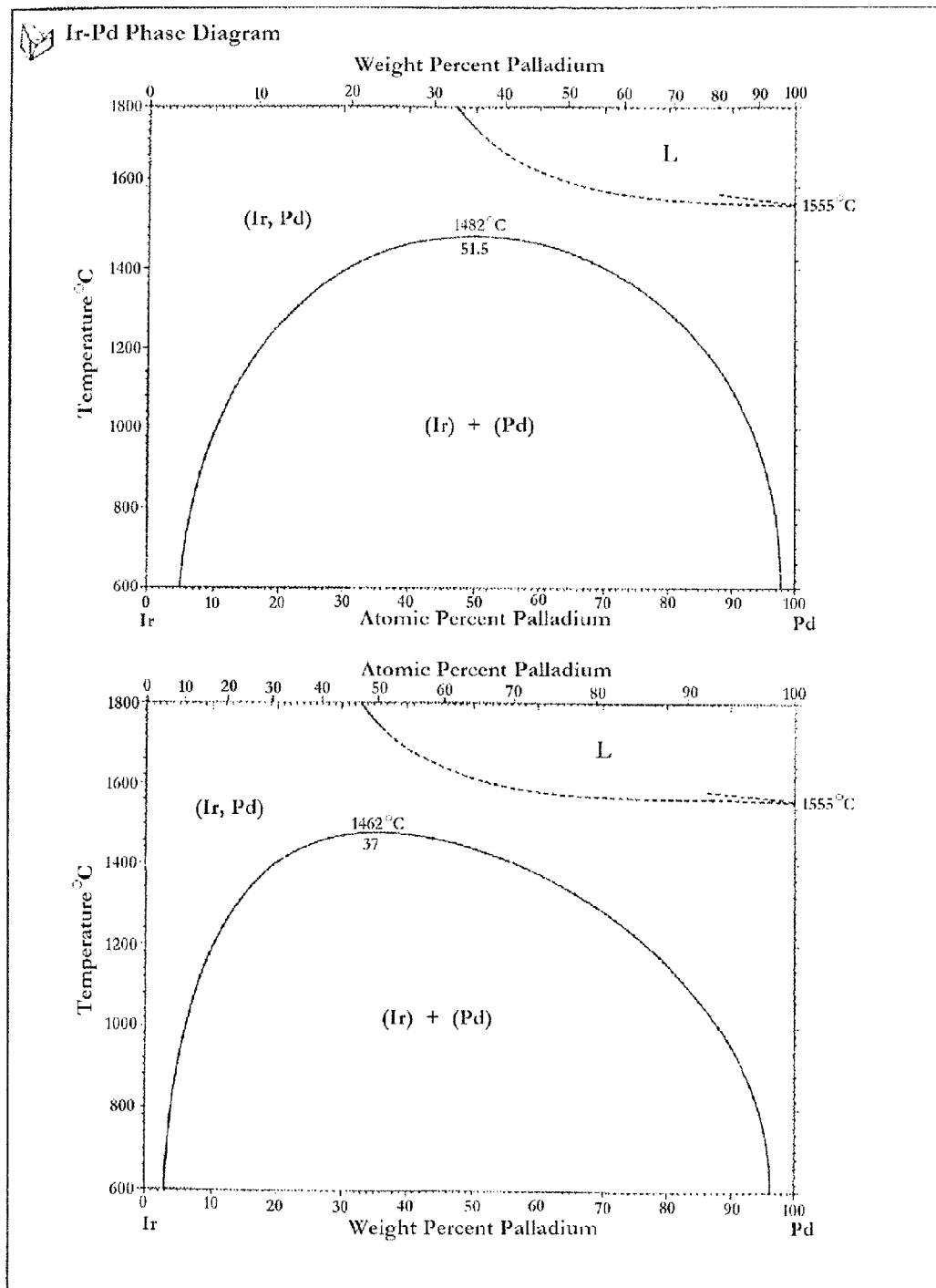
Figure 7E:
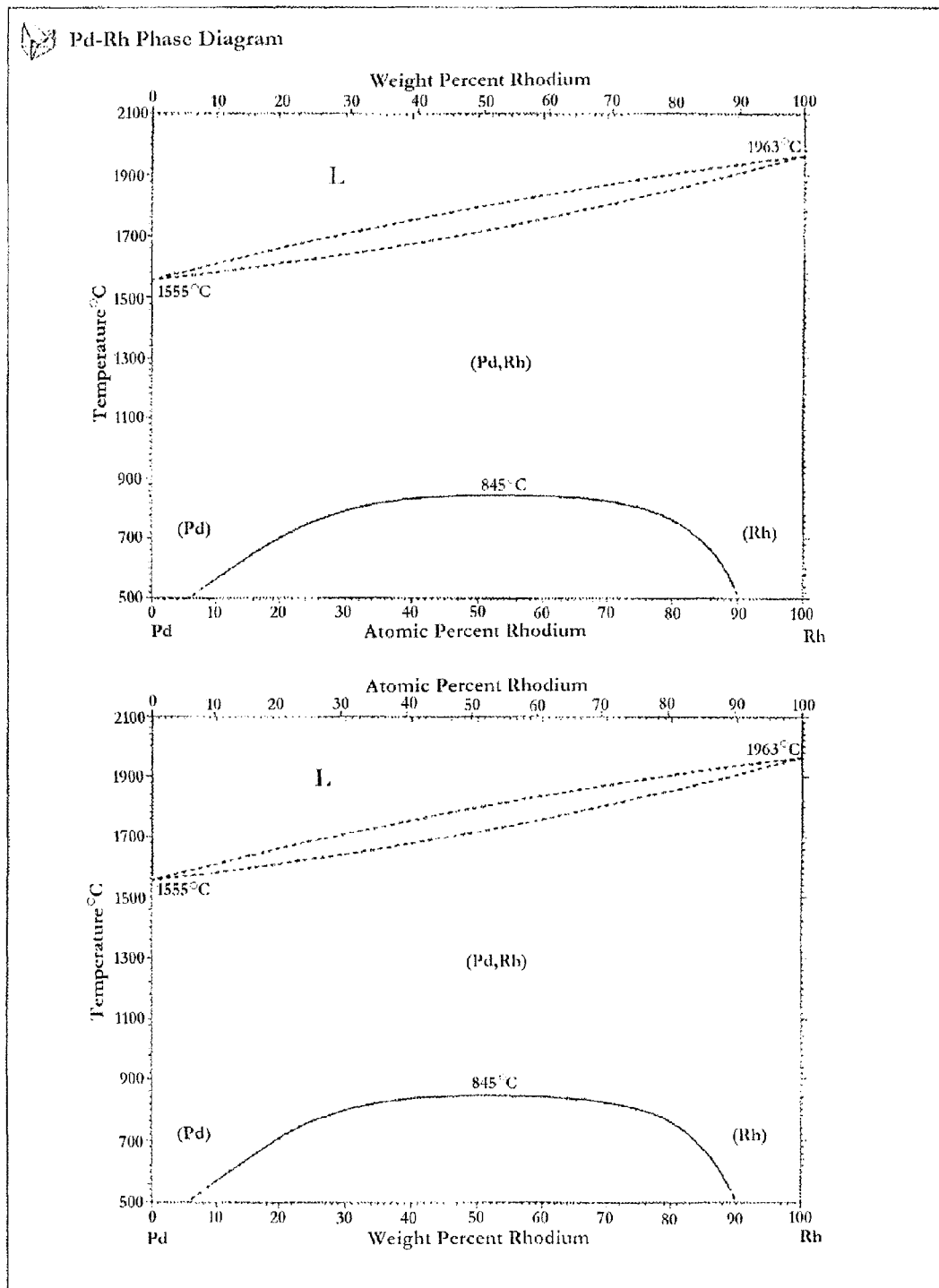
Figure 8A:
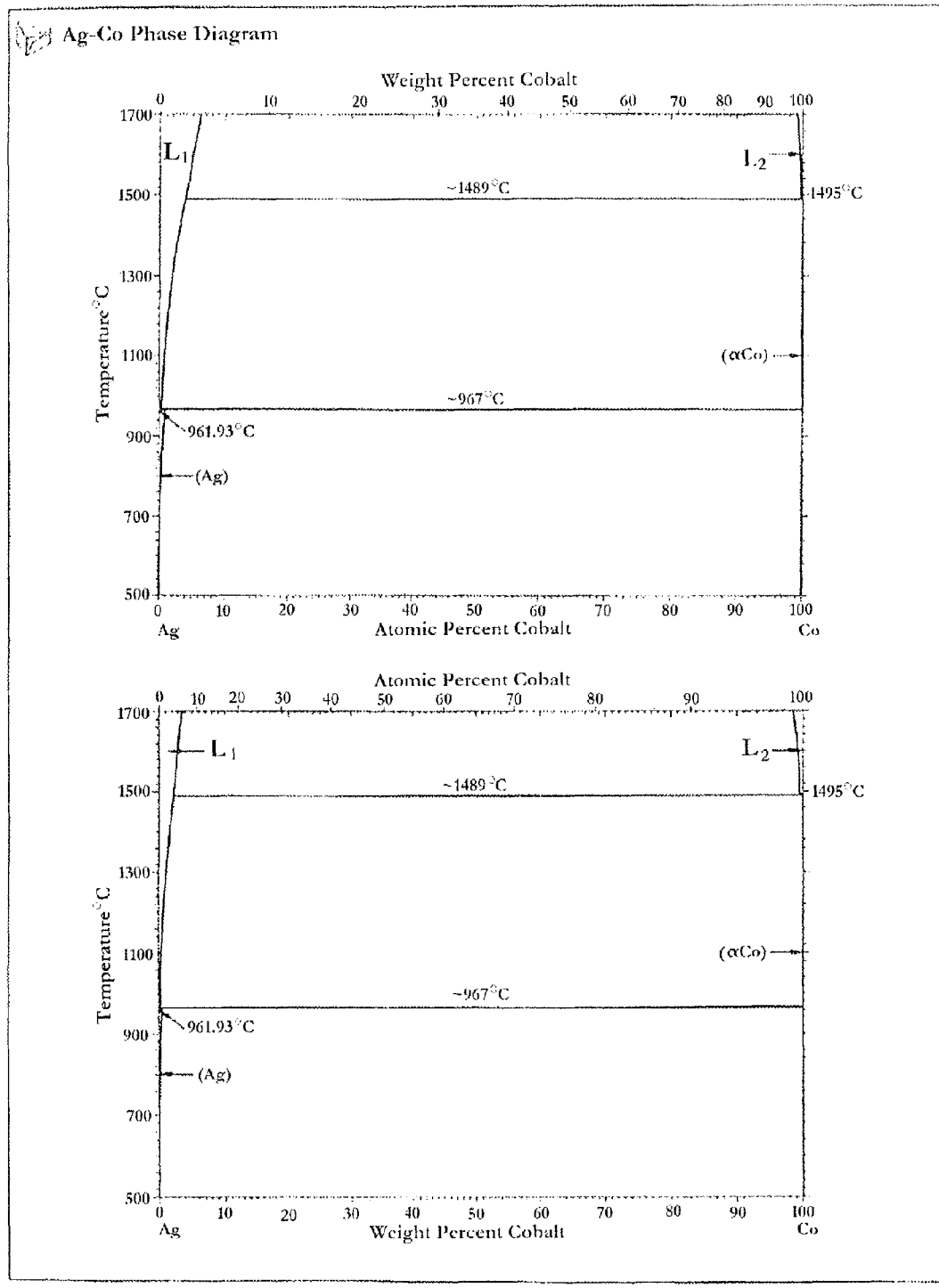
FIG. 8($a$) illustrates the phase diagram for silver and cobalt.
Figure 8B:
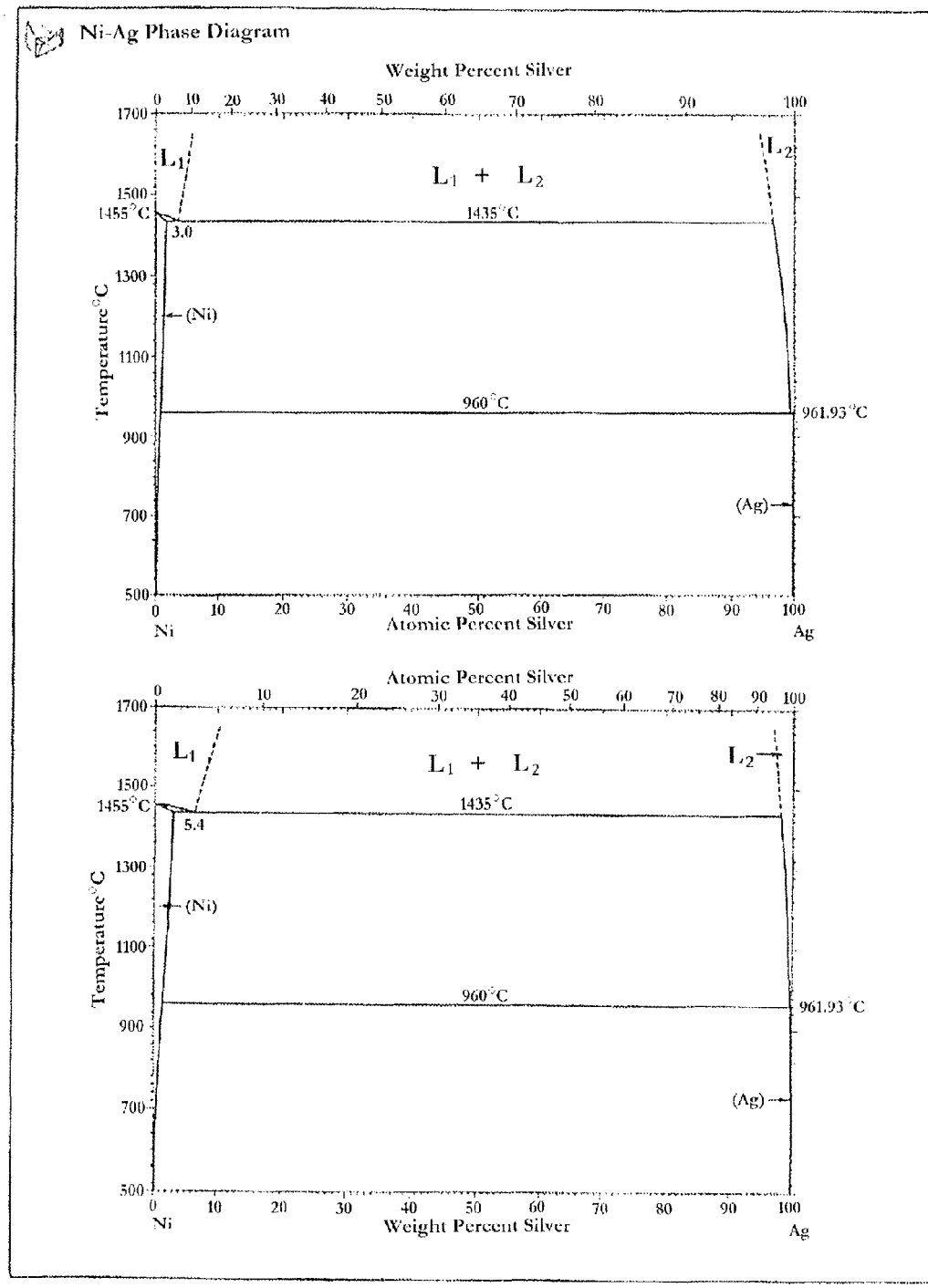
Figure 8C:
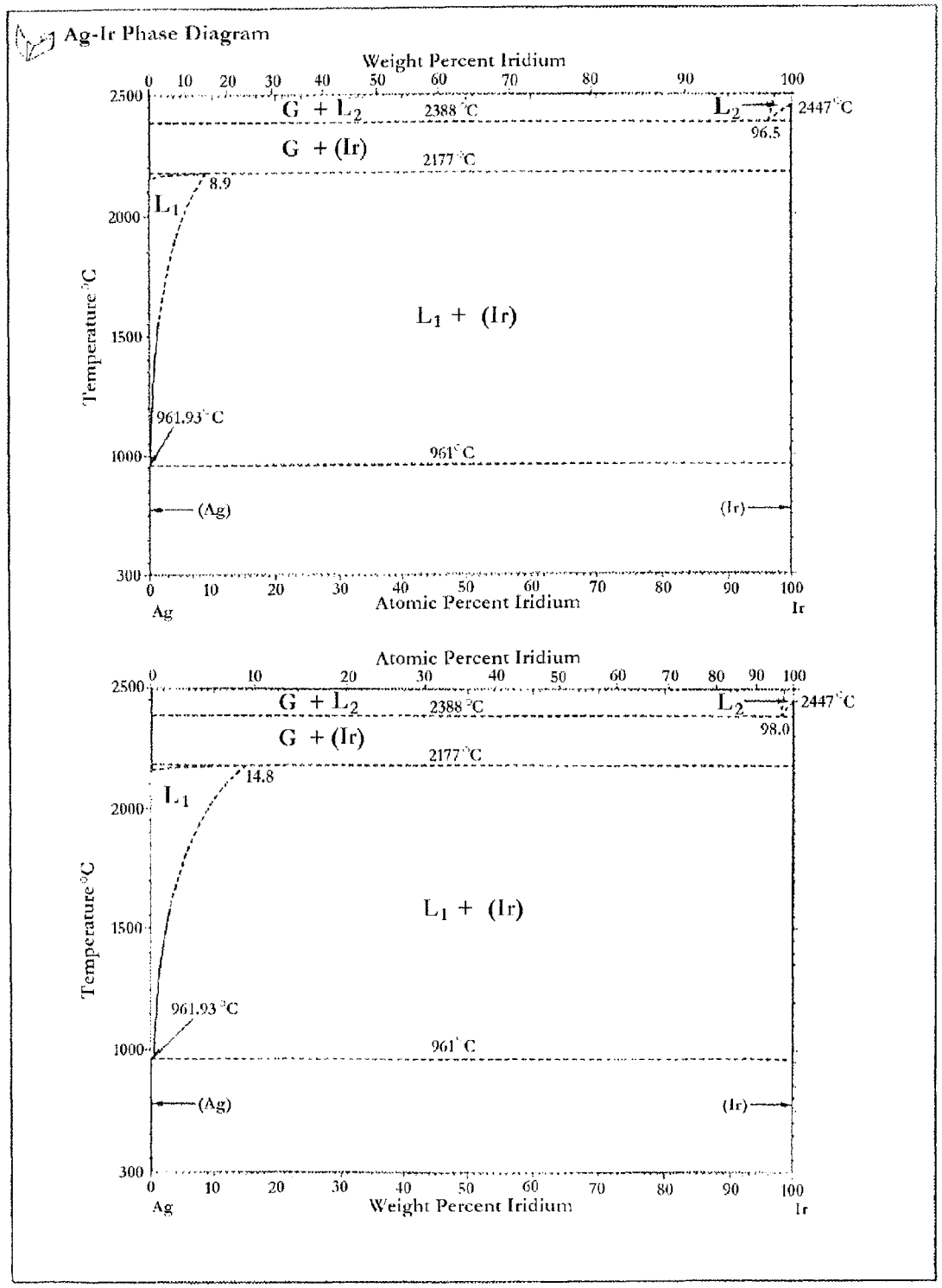
Figure 8D:
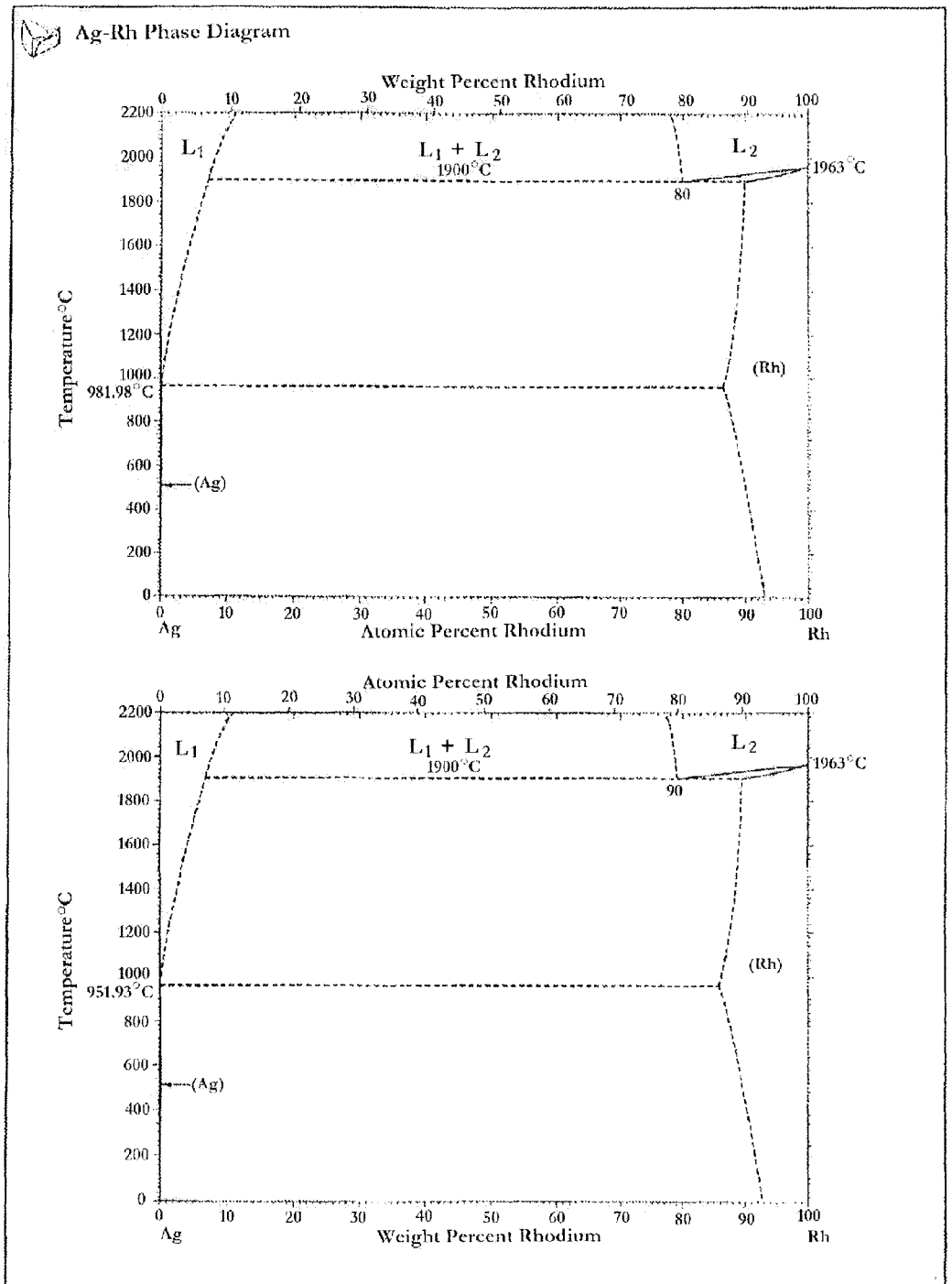
Figure 8E:
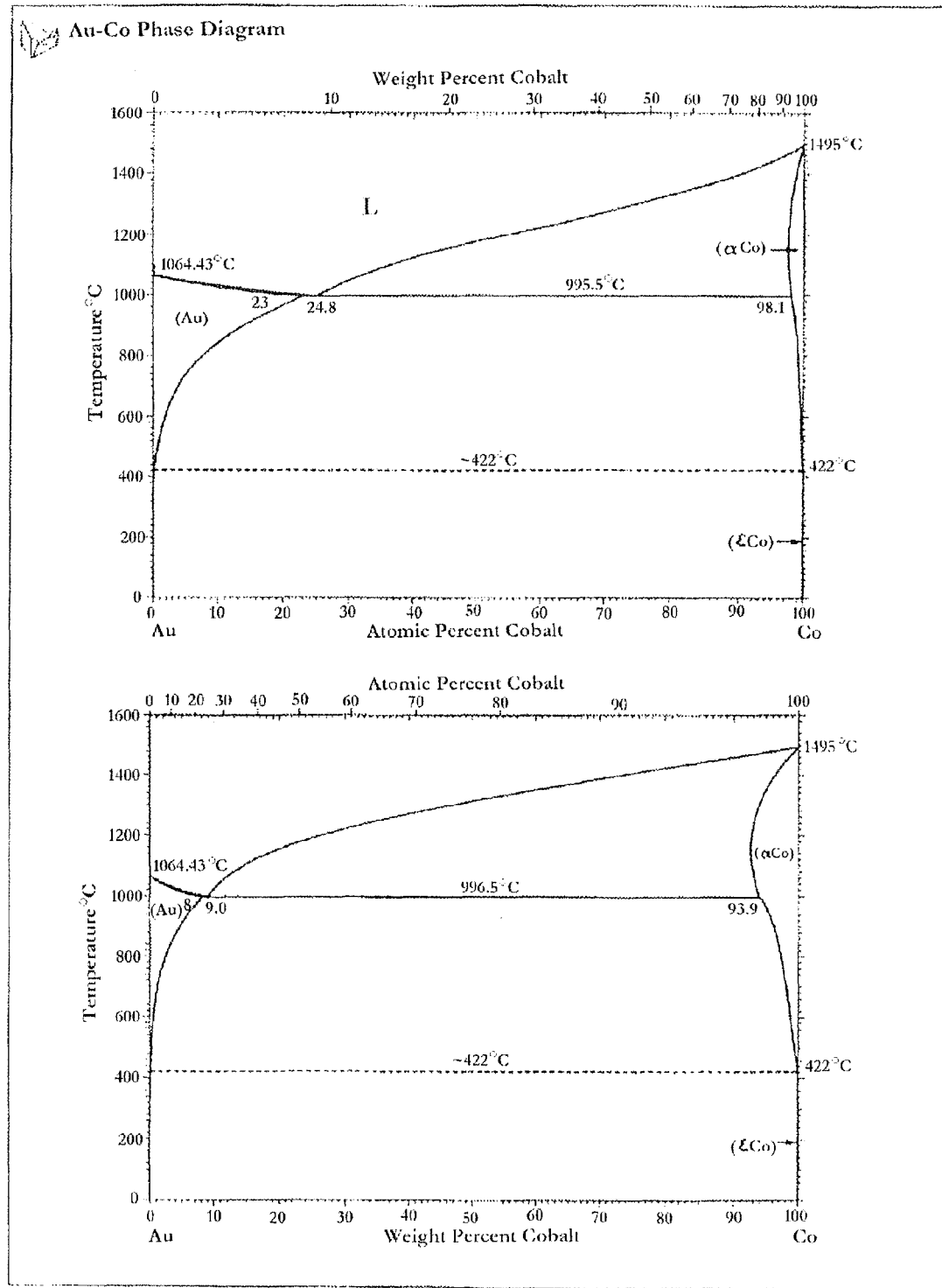
Figure 8F:
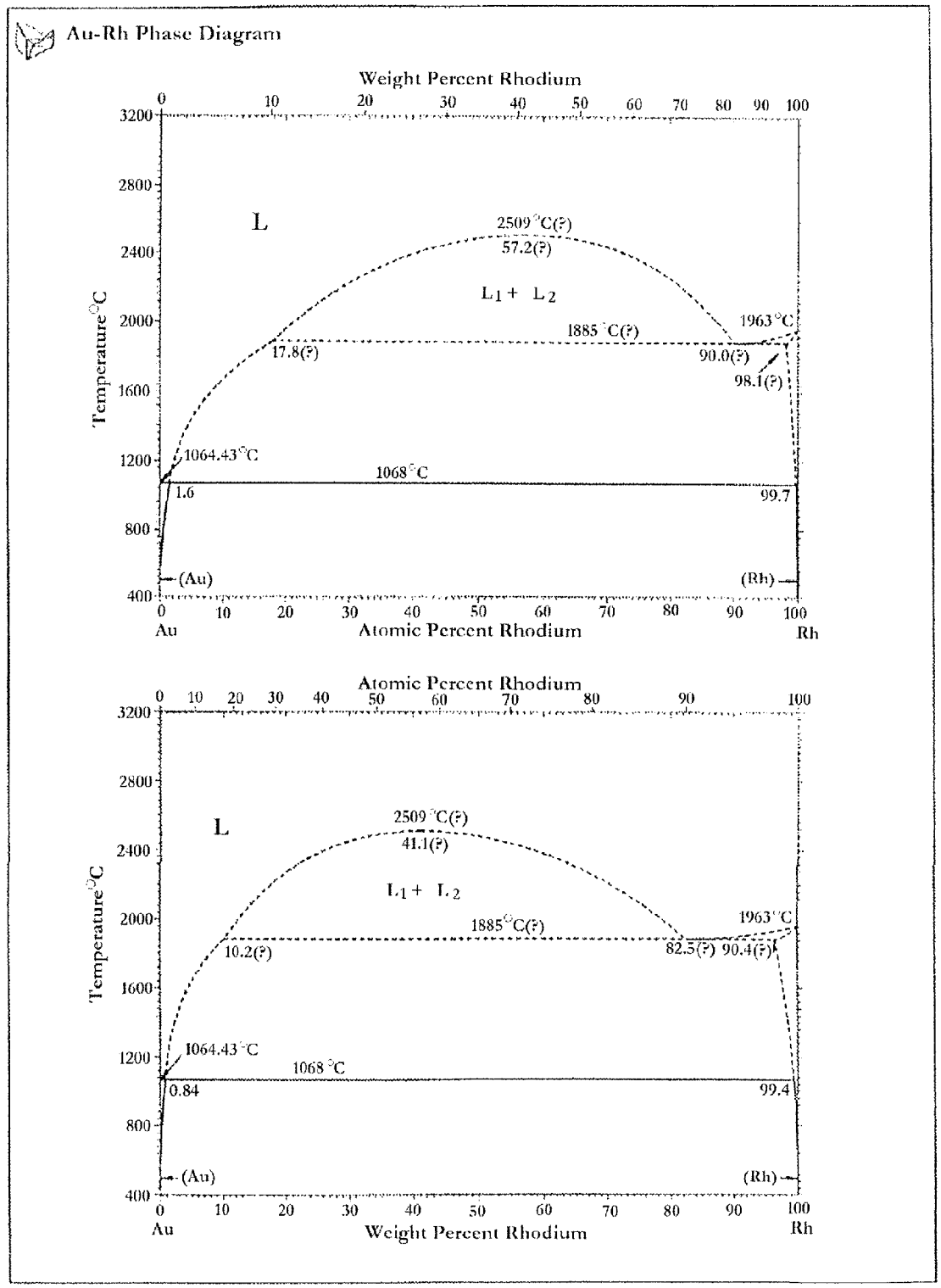

The metal (added metal) added to palladium is preferably a transition metal of Groups 9 to 11 on the periodic table. Preferable examples of the two added metals used for the hydrogen separation membrane according to this embodiment include silver, gold, copper, iridium, rhodium, cobalt, and nickel. The phase diagram for silver and copper is shown in FIG. 6C. The phase diagram for silver and cobalt, nickel and silver, silver and iridium, silver and rhodium, gold and cobalt, and gold and rhodium are shown in FIGS. 8(a)-8(f), respectively.

The combination of two kinds of the added metal A and the added metal B in the hydrogen separation membrane according to this embodiment is preferably a combination of silver and copper, a combination of silver and nickel, a combination of silver and cobalt, a combination of silver and iridium, a combination of silver and rhodium, a combination of gold and cobalt, a combination of gold and iridium, or a combination of gold and rhodium. Among these, a combination of silver and copper, a combination of silver and cobalt, a combination of gold and cobalt, a combination of gold and iridium, or a combination of gold and rhodium is more preferable.

Among these metals, gold or copper forms a complete solid solution with palladium and produces an intermetallic compound with palladium under given conditions. Therefore, it is preferable to use gold or copper in order to implement an element distribution required to improve durability. Therefore, it is particularly preferable to employ a combination including gold or copper.

The content of palladium in the palladium alloy that forms the hydrogen separation membrane is preferably 40 to 90 mass %, and more preferably 60 to 90 mass %. If the content of palladium is 40 mass % or more, a decrease in hydrogen permeability can be suppressed. It is preferable that the content of palladium be 90 mass % or less so that the added metals exhibit sufficient effects.

The content of each of the added metals in the hydrogen separation membrane may be set to an arbitrary value within a range that ensures the effects of addition insofar as the hydrogen permeability does not deteriorate to a large extent.

For example, when using silver and copper as two kinds of the added metal A and the added metal B, the content of silver in the palladium alloy is preferably 10 to 40 parts by mass, and more preferably 20 to 30 parts by mass, based on 100 parts by mass of palladium. The content of copper in the palladium alloy is preferably 1 to 15 parts by mass based on 100 parts by mass of palladium.

According to this configuration, since the added metals are an extent that defects of the hydrogen separation membrane can be suppressed without causing a significant deterioration in hydrogen permeability, the durability of the hydrogen separation membrane can be improved.

When two kinds of the added metal A and the added metal B form a complete solid solution, the entire palladium alloy has an almost uniform element distribution. Therefore, defects of the hydrogen separation membrane are not suppressed as compared with the palladium alloy that forms the hydrogen separation membrane according to this embodiment, although advantageous results can be obtained as compared with pure palladium.

In the hydrogen separation membrane according to this embodiment, it is preferable that the palladium alloy have been heat treated at a temperature within ±100° C. of the triple point of the added metal A and the added metal B in the equilibrium diagram. This further improves the durability of the hydrogen separation membrane.

The palladium alloy used for the hydrogen separation membrane according to this embodiment is not limited to a palladium alloy to which two added metals (e.g., silver and copper) are added, but may be a palladium alloy to which three or more added metals are added. In this case, the third or subsequent added metal may or may not form a complete solid solution with palladium and other added metals.

The thickness of the hydrogen separation membrane according to this embodiment is not particularly limited, but is preferably 0.1 to 10 μm, more preferably 1 to 10 μm, and particularly 1 to 7 μm, for example. Since the hydrogen separation membrane according to this embodiment has improved durability as compared with a related-art separation membrane, the thickness of the separation membrane can be reduced while achieving a durability almost equal to that of a related-art separation membrane. This makes it possible to further improve hydrogen permeability.

The hydrogen permeation coefficient of the hydrogen separation membrane according to this embodiment is preferably 50% or more, more preferably 80% or more, and particularly preferably 100% or more, of the hydrogen permeation coefficient of a hydrogen separation membrane that is formed of pure palladium and has an identical thickness. If the hydrogen permeation coefficient is 50% or more of that of pure palladium, the hydrogen separation membrane can be used in practice taking account of an improvement in durability.

When a high hydrogen permeation rate is required, the thickness of the hydrogen separation membrane can be reduced since the hydrogen separation membrane according to this embodiment has excellent durability. Note that the term "hydrogen permeation coefficient" refers to a value (K) calculated by "$Y=K\Delta P^{1/2}$" (where, Y is the permeation flow rate, and $\Delta P^{1/2}$ is the difference in the 1/2nd power of the hydrogen partial pressure between the supply side and the permeation side (separation side).

The hydrogen permeation coefficient may be determined by introducing hydrogen at 3 to 9 atm into the hydrogen separation membrane heated at 400 to 600° C., and measuring the amount of hydrogen that passes through the hydrogen separation membrane, for example.

The hydrogen permeation coefficient of the hydrogen separation membrane is preferably 60 ml/cm$^2$·min·atm$^{1/2}$ or more, and more preferably 120 ml/cm$^2$·min·atm$^{1/2}$ or more. If the hydrogen permeation coefficient of the hydrogen separation membrane is less than 60 ml/cm$^2$·min·atm$^{1/2}$, a reaction promotion effect due to hydrogen separation may decrease due to a decrease in hydrogen permeation rate.

[1-2] Method of Producing Hydrogen Separation Membrane

A method of producing the hydrogen separation membrane according to this embodiment is described below. In the following description, a hydrogen separation membrane is produced using a palladium alloy formed of palladium, silver, and copper and disposing on the surface of a porous substrate.

When producing the hydrogen separation membrane according to this embodiment, palladium, copper, and silver are sequentially deposited on the surface of a porous substrate (e.g., alumina) to form a laminate, and the laminate is alloyed by heat treating the laminate. A hydrogen separation membrane formed of a palladium alloy in which palladium and silver form a solid solution and palladium and copper form a solid solution can be produced in this manner.

Palladium and the added metals may be deposited to form a laminate on the surface of the substrate using a known method. For example, a plating method, a vacuum deposition method, a CVD method, a sputtering method, or the like may be used.

It is preferable that the laminate formed by depositing each metal is heat treated at a temperature within ±100° C. of the triple point of the two added metals in the equilibrium diagram. If the laminate is heat treated within such a temperature range, alloying is promoted while implementing an element distribution required to improve durability. When performing the alloying process at a temperature outside the range within ±100° C. of the triple point of the two added metals in the equilibrium diagram, it is preferable to subsequently heat treat the resulting product at a temperature within ±100° C. of the triple point.

The heat treatment temperature varies depending on the types of added metals. For example, the phase transition temperature for silver and copper is 780° C., as shown in FIG. 6C. When using silver and copper, the heat treatment temperature is preferably 680 to 880° C. The heating time varies depending on the thickness of the hydrogen separation membrane, but is preferably one hour or more in order to ensure sufficient alloying. The heating time is 48 hours or less from the viewpoint of productivity.

The laminate is preferably heat treated in an inert atmosphere or a reducing atmosphere (e.g., argon gas or nitrogen gas atmosphere). According to this configuration, oxidation of the palladium alloy can be prevented so that a high-quality hydrogen separation membrane can be produced.

[2] Hydrogen Separator

Figure 1:
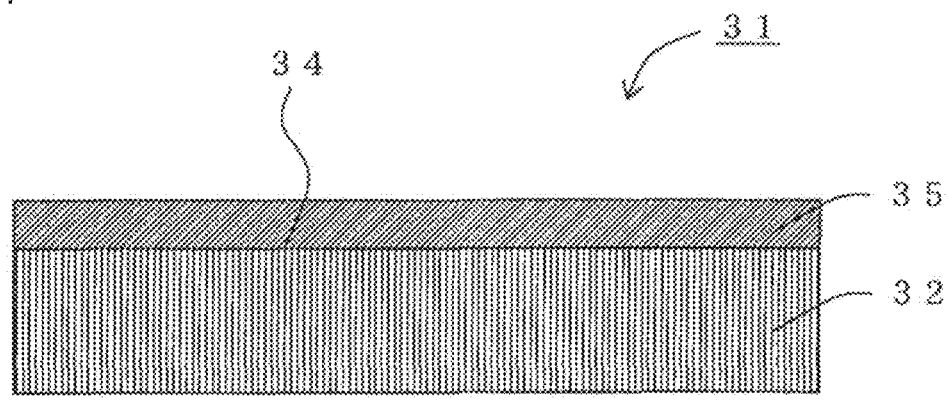
FIG. 1 is a cross-sectional view schematically showing a hydrogen separator according to one embodiment of the present invention.

A hydrogen separator according to one embodiment of the present invention is described below. As shown in FIG. 1, a hydrogen separator 31 according to this embodiment includes a porous substrate 32 that contains a ceramic or a metal as the main component and has a plurality of pores formed from one surface 34 to another surface, and the above-described hydrogen separation membrane 35 according to the present invention that is disposed on the surface 34 of the porous substrate 32. FIG. 1 is a cross-sectional view schematically showing the hydrogen separator according to one embodiment of the present invention. The term "main component" used herein refers to a component that is contained in a substance in an amount of 50 mass % or more.

The hydrogen separator according to this embodiment selectively allows only hydrogen contained in a hydrogen-containing gas (i.e., treatment target gas) that enters one surface or another surface of the porous substrate to pass through and to flow out from the other surface or the one surface. When separating hydrogen from the treatment target gas using the hydrogen separator according to this embodiment, the treatment target gas may be caused to enter the one surface and flow out from the other surface, or may be caused to enter the other surface and flow out from the one surface.

The porous substrate has a plurality of minute pores that are continuously formed three-dimensionally. The diameter of the pores is preferably 0.003 to 2 µm, and more preferably 0.1 to 1 µm. If the diameter of the pores is less than 0.003 µm, the gas flow resistance may increase. If the diameter of the pores is more than 2 µm, it may be difficult to close the pores when disposing the hydrogen separation membrane on the surface of the porous substrate so that air-tightness may decrease. It is preferable that the pores formed in the porous substrate have a uniform diameter.

A porous substrate of the hydrogen separator according to this embodiment is not particularly limited. However, a porous substrate used for a known hydrogen separator may be suitably used, for example. Examples of the porous substrate include a ceramic, a metal, a ceramic-metal composite, and the like. Examples of the ceramic include alumina, titania, silica, silica-alumina, mullite, cordierite, zirconia, and the like. The ceramic may contain a small amount of unavoidable components or components that are normally added.

[3] Selectively Permeable Membrane Reactor

Figure 2:
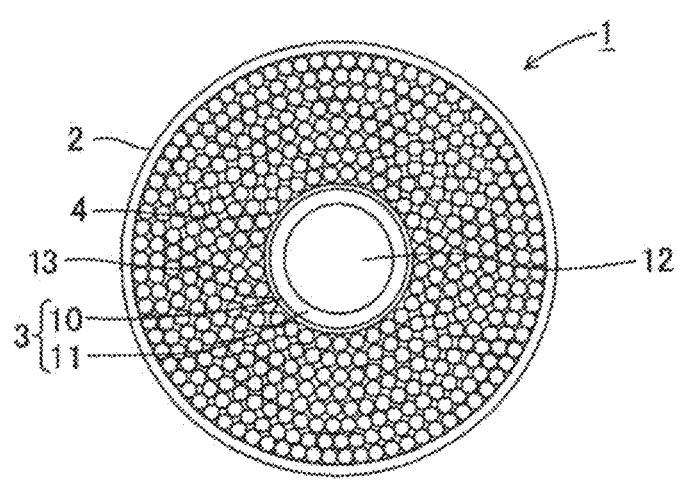
FIG. 2 is a cross-sectional view schematically showing a selectively permeable membrane reactor according to one embodiment of the present invention.

A selectively permeable membrane reactor according to one embodiment of the present invention is described in detail below. FIG. 2 is a cross-sectional view schematically showing the selectively permeable membrane reactor according to this embodiment, and FIG. 3 is a cross-sectional view showing the selectively permeable membrane reactor shown in FIG. 2 along a plane including the center axis of the selectively permeable membrane reactor.

Figure 3:
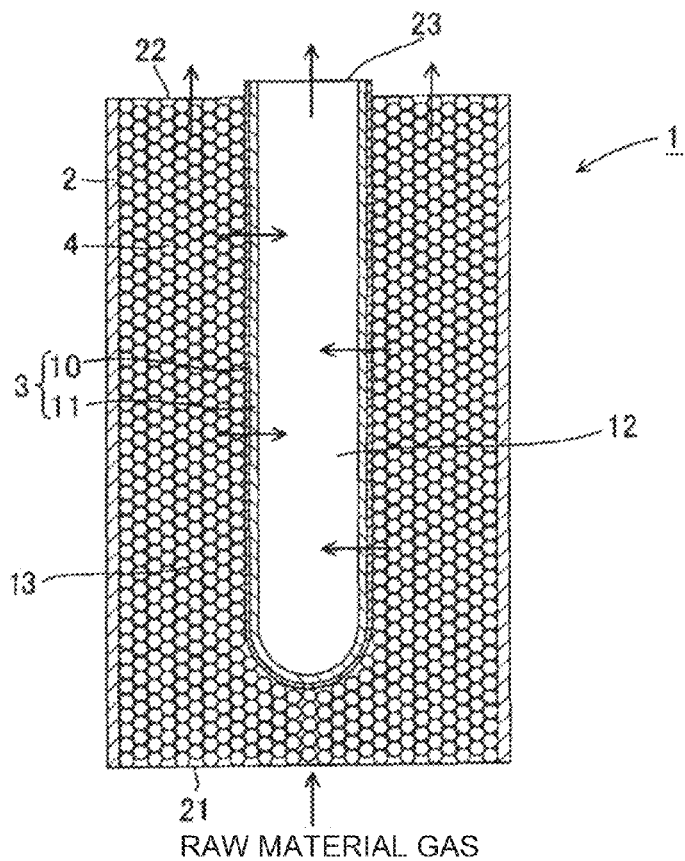
FIG. 3 is a cross-sectional view showing the selectively permeable membrane reactor shown in FIG. 2 along a plane including the center axis of the selectively permeable membrane reactor.

As shown in FIGS. 2 and 3, a selectively permeable membrane reactor 1 (hereinafter may be simply referred to as "reactor 1") according to this embodiment includes a reaction tube 2, one end of the reaction tube 2 being a gas inlet 21 and the other end of the reaction tube 2 being a gas outlet 22, a separation tube 3 that is inserted into the reaction tube 2 and includes a selectively permeable membrane 10 that selectively allows hydrogen to pass through on its surface, and a catalyst 4 that is disposed between the reaction tube 2 and the separation tube 3 and promotes a reaction for producing hydrogen from a raw material gas, the selectively permeable membrane 10 being the hydrogen separation membrane according to the present invention described the above. The separation tube 3 shown in FIGS. 2 and 3 includes the selectively permeable membrane 10 and a porous substrate 11, the selectively permeable membrane 10 being disposed on the surface of the porous substrate 11.

The hydrogen separation membrane used as the selectively permeable membrane 10 comprises a palladium alloy that includes at least palladium, an added metal A, and an added metal B, the added metal A and the added metal B being different metals other than palladium, each of two kinds of the added metal A and the added metal B forming a complete solid solution with palladium, and the different two kinds of the added metal A and the added metal B having a triple point in an equilibrium diagram and not forming an intermetallic compound.

The selectively permeable membrane reactor 1 according to this embodiment can produce hydrogen from hydrocarbons (e.g., methane, propane, butane, or kerosene) or oxygenated hydrocarbons (e.g., methanol) as a main raw material gas by utilizing a reforming reaction or the like using the catalyst 4. Hydrogen thus produced selectively enters the separation tube 3 through the selectively permeable membrane 10 (hydrogen separation membrane) (i.e., is separated from other gas components), and is removed. The components that do not pass through the selectively permeable membrane 10 are discharged from the reactor 1 through the outlet 22.

Since the selectively permeable membrane reactor 1 according to this embodiment utilizes the above described hydrogen separation membrane according to the present invention as the selectively permeable membrane 10, the selectively permeable membrane reactor 1 exhibits excellent hydrogen permeability and durability. Moreover, since the amount of relatively expensive palladium used for the hydrogen separation membrane can be reduced, the reactor can be produced at low cost.

Since the selectively permeable membrane reactor 1 can produce hydrogen from the raw material gas while separating hydrogen, the size of the selectively permeable membrane reactor 1 can be reduced. Moreover, since the equilibrium of the reaction can be shifted toward the hydrogen production side by separating hydrogen so that the reaction temperature can be reduced, a decrease in operating temperature, prevention of a deterioration in the metal member, and a reduction in energy consumption can be achieved.

[3-1] Reaction Tube

The reaction tube 2 of the selectively permeable membrane reactor 1 according to this embodiment shown in FIGS. 2 and 3 is a tubular body (e.g., cylindrical body). One end of the tubular body serves as the gas inlet 21, and the other end of the tubular body serves as the gas outlet 22. The raw material gas supplied to the tubular body is reacted using the catalyst 4 to produce a hydrogen-containing gas.

The material for the reaction tube 2 is not particularly limited. It is preferable that the reaction tube 2 be formed of a material that includes a heat-resistant metal that exhibits excellent thermal conductivity (e.g., stainless steel or Incoloy) as the main component.

The size of the reaction tube 2 may be appropriately selected taking account of the amount of hydrogen produced by the selectively permeable membrane reactor 1 and the like.

The gas inlet 21 of the reaction tube 2 is connected to a gas supply section that supplies the raw material gas. The raw material gas supply section may supply the raw material gas from a raw material gas storage vessel via a flow controller through a pipe, for example. The raw material gas supply section may be integrally formed with the reaction tube 2 in order to reduce the size of the reactor 1, or may be separately formed from the reaction tube 2 so that the raw material gas supply section can be removed.

Examples of the raw material gas introduced through the gas inlet 21 of the reaction tube 2 include hydrocarbons (e.g., methane, ethane, propane, butane, kerosene, and naphtha), alcohols (e.g., methanol and ethanol), ethers (e.g., dimethyl ether), oxygen-containing organic compounds (e.g., ketone), steam, oxygen, carbon dioxide, and the like. The raw material gas is optionally selected and mixed, and supplied to the reaction tube. A liquid raw material such as water or ethanol is gasified using a vaporizer, and supplied to the reaction tube.

It is preferable that the gas outlet 22 of the reaction tube 2 be provided with a pressure control section that adjusts the pressure of the hydrogen-containing gas that has been reacted inside the tubular body. The gas outlet 22 of the reaction tube 2 may also be provided with a gas treatment section that detoxifies unreacted raw material gas and a product gas that has not passed through the selectively permeable membrane 10.

[3-2] Separation Tube

The separation tube 3 is inserted into the reaction tube 2, and includes the selectively permeable membrane 10 that selectively allows hydrogen to pass through on its surface. Since the selectively permeable membrane 10 that separates hydrogen has low mechanical strength due to a small thickness, the separation tube 3 is formed by disposing the selectively permeable membrane 10 on the surface of the substrate 11 (e.g., porous body).

As the substrate that forms the separation tube 3, a ceramic porous body (e.g., titania, zirconia, or alumina), a surface-treated metal porous body (e.g., stainless steel), or a ceramic-metal composite (cermet) is preferably used. In the selectively permeable membrane reactor 1 shown in FIGS. 2 and 3, the selectively permeable membrane 10 is disposed on the outer side the separation tube 3. Note that the selectively permeable membrane 10 may be disposed on the inner side or the end of the separation tube (not shown), for example.

The separation tube 3 preferably has a bottomed tubular shape having a closed end, as shown in FIG. 3. Note that one end of the tubular body may have an air-tight structure using a flange or the like. The other end of the separation tube 3 serves as a separation outlet 23 that discharges hydrogen that has entered a separation section 12 inside the separation tube 3 through the selectively permeable membrane 10. The pressure inside the separation section 12 may be equal to or higher than normal pressure. However, since the hydrogen permeability of the selectively permeable membrane 10 is improved when the difference in hydrogen partial pressure between the outside and the inside of the separation tube 3 is large, the hydrogen partial pressure in the separation section 12 is normally reduced. In this case, a sweep gas such as steam is caused to flow through the separation section 12, or the pressure inside the separation section 12 is reduced using a vacuum pump. It is preferable to reduce the pressure inside the separation section 12 without adding a gas component other than hydrogen from the viewpoint of the purity of the resulting hydrogen.

A flowmeter that measures the amount of gas discharged and a gas chromatograph that quantitatively determine the gas components may be connected to the gas outlet 22 of the reaction tube 2 and the separation outlet 23 of the separation tube 3. A liquid trap that is set at about 5° C. may be provided on the upstream side of the flowmeter in order to collect a component (e.g., water) that is liquid at room temperature.

The thickness of the hydrogen separation membrane used as the selectively permeable membrane 10 is not particularly limited. If the thickness of the hydrogen separation membrane is 10 μm or less, the hydrogen separation membrane exhibits excellent permeability and separation performance.

If the thickness of the hydrogen separation membrane exceeds 10 μm, a sufficient hydrogen separation effect may not be obtained so that hydrogen permeability may deteriorate.

Hydrogen permeability is improved by reducing the thickness of the hydrogen separation membrane used as the selectively permeable membrane 10 so that hydrogen can be efficiently collected. However, the durability and the hydrogen selectivity of the hydrogen separation membrane may decrease if the thickness of the hydrogen separation membrane is reduced to a large extent. If the number of defects (e.g., pinholes) increases during use of the selectively permeable membrane reactor 1 so that components other than hydrogen pass through the hydrogen separation membrane, the amount of impurity gas increases (i.e., the purity of the resulting hydrogen decreases). The thickness of the hydrogen separation membrane is preferably 0.1 to 10 μm, more preferably 1 to 10 μm, and particularly preferably 1 to 7 μm considering the valance between the durability and the efficiency of recovery of hydrogen.

[3-3] Catalyst The catalyst 4 is disposed in the space (hereinafter may be referred to as "reaction space 13") between the reaction tube 2 and the separation tube 3, and promotes a raw material gas reforming reaction and the like. The catalyst 4 preferably contains at least one metal selected from the group consisting of iron (Fe), cobalt (Co), nickel (Ni), copper (Cu), molybdenum (Mo), ruthenium (Ru), rhodium (Rh), palladium (Pd), silver (Ag), tungsten (W), rhenium (Re), osmium (Os), iridium (Ir), platinum (Pt), and gold (Au) as a catalytic active component.

As the catalyst 4, a catalyst in which a compound that contains a metal used as the catalytic active component (e.g., a metal used as the catalytic active component) described the above is supported on a support formed in the shape of pellets, a foam, or a honeycomb, or a catalyst formed in the shape of pellets, a foam, or a honeycomb may be suitably used. Examples of a preferable combination of the metal used as the catalytic active component and the support (metal-support) include nickel-alumina, ruthenium-alumina, and rhodium-alumina.

A reforming reaction catalyst used for a known selectively permeable membrane reactor or the like may be suitably used as the catalyst.

[3-4] Hydrogen Production Method

A hydrogen production method using the selectively permeable membrane reactor according to this embodiment shown in FIGS. 2 and 3 is described in detail below. The hydrogen production method includes a step of supplying the raw material gas to the reaction tube 2 through the gas inlet 21 of the reaction tube 2, a step of reacting the raw material gas in the reaction space 13 filled with the catalyst 4 to produce a hydrogen-containing reaction gas, and a step of separating hydrogen from the reaction gas into the separation section 12 using the selectively permeable membrane 10 (see FIG. 3). The following description mainly focuses on a methane-steam reaction system (e.g., steam-reforming reaction of methane shown by "$CH_4 + 2H_2O \rightarrow CO + 4H_2$"). Note that the hydrogen production method may also be applied to other raw material systems.

Specifically, methane and steam (i.e., raw material gas) supplied from the gas supply section are introduced into the reaction space 13 inside the reaction tube 2 through the gas inlet 21, and come in contact with the reforming reaction catalyst 4 disposed in the reaction space 13. As a result, a reformed gas (reaction gas) is produced as a hydrogen-containing mixed gas. Hydrogen contained in the reformed gas passes through the selectively permeable membrane 10 of the separation tube 3, and is selectively introduced into the separation section 12 inside the separation tube 3. Hydrogen that has been introduced into the separation section 12 is discharged from the separation outlet 23 and collected as high-purity hydrogen gas. The gas components other than hydrogen (e.g., carbon monoxide, carbon dioxide, and unreacted raw material gas) that do not pass through the selectively permeable membrane 10 are discharged from the selectively permeable membrane reactor 1 through the gas outlet 22 of the reaction tube 2.

It is preferable to provide a heater or the like around the selectively permeable membrane reactor 1 so that the reactor can be externally heated. When causing a steam reforming reaction of methane, the reactor is heated so that the temperature of the reaction space 13 reaches 400 to 600° C., and preferably 500 to 550° C., for example.

A pressure regulator may be provided in a gas line on the downstream side of each of the gas outlet 22 of the reaction tube 2 and the separation outlet 23 of the separation tube 3 so that the pressure inside the reaction space 13 that is formed outside the separation tube 3 and the pressure inside the separation section 12 that is formed inside the separation tube 3 can be adjusted to given values. The pressure inside the reaction space 13 is preferably adjusted by introducing the raw material gas so that the total pressure is 3 to 9 atm, and more preferably 5 to 9 atm. The pressure inside the separation section 12 is preferably adjusted so that the total pressure is 0.05 to 2 atm.

EXAMPLES

The hydrogen separation membrane according to the present invention is further described below by way of examples. Note that the present invention is not limited to the following examples.

Example 1

An α-alumina tube having a cylindrical shape (outer diameter: 10 mm, length: 100 mm, average surface pore size: 0.1 μm) was used as a substrate. Palladium, copper, and silver were sequentially deposited on the surface of the cylindrical substrate using a plating method to form a laminate. Palladium, copper, and silver were deposited so that the rate of silver was 25 parts by mass, and the rate of copper was 9 parts by mass with respect to 100 parts by mass of palladium. The resulting laminate was alloyed by heat treating at 700° C. for one hour in argon gas to obtain a hydrogen separation membrane formed of the palladium alloy. The thickness of the hydrogen separation membrane was 2 μm.

After sealing the ends of the cylindrical substrate on which the hydrogen separation membrane was disposed, the substrate was placed in a pressure-resistant container to obtain a hydrogen separator having the hydrogen separation membrane. The hydrogen separation membrane used for the hydrogen separator was subjected to a hydrogen permeation test. In the hydrogen permeation test, the temperature of the hydrogen separation membrane was increased to 500° C. in an argon gas atmosphere by heating the pressure-resistant container. Hydrogen (7 atm) was then introduced into the pressure-resistant container, and the amount of hydrogen that passed through the hydrogen separation membrane placed in the pressure-resistant container was measured. The measurement results are indicated by the percentage with respect to the amount of hydrogen that passed through the hydrogen separation membrane in the hydrogen permeation test in Comparative Example 1 (hydrogen separation membrane formed of palladium) (=100%). The results are shown in Table 1. In Examples 2 to 10 and Comparative Examples 1 and 2, the hydrogen permeation test was carried out in the same manner as in Example 1.

TABLE 1

| | Composition of palladium alloy | | | Results of |
| --- | --- | --- | --- | --- |
| | Palladium (parts by mass) | Silver (parts by mass) | Copper (parts by mass) | hydrogen permeation test (%) |
| Example 1 | 100 | 25 | 9 | 160 |
| Example 2 | 100 | 25 | 2 | 167 |
| Example 3 | 100 | 25 | 4 | 141 |
| Comparative Example 1 | 100 | — | — | 100 |
| Comparative Example 2 | 100 | 25 | — | 160 |

After removing hydrogen from the hydrogen separator subjected to the hydrogen permeation test for one hour, the temperature of the hydrogen separation membrane was decreased from 500° C. to room temperature in an argon gas atmosphere. This operation was repeated thirty times (thirty cycles) as a durability test. The amount of He that leaked from the hydrogen separation membrane was measured each time the above operation was performed twice. The measurement results are shown in Table 2.

TABLE 2

| | He leakage amount | | |
| --- | --- | --- | --- |
| Cycle | Example 1 (ml/min · cm$^2$) | Comparative Example 1 (ml/min · cm$^2$) | Comparative Example 2 (ml/min · cm$^2$) |
| 0 | 0.032 | 0.008 | 0.030 |
| 2 | 0.027 | 0.098 | 0.034 |
| 4 | 0.027 | — | 0.038 |
| 6 | 0.028 | — | 0.040 |
| 8 | 0.029 | — | 0.041 |
| 10 | 0.029 | — | 0.044 |
| 12 | 0.028 | — | 0.046 |
| 14 | 0.027 | — | 0.049 |
| 16 | 0.027 | — | 0.052 |
| 18 | 0.027 | — | 0.058 |
| 20 | 0.028 | — | 0.061 |
| 22 | 0.028 | — | 0.062 |
| 24 | 0.029 | — | 0.059 |
| 26 | 0.028 | — | 0.067 |
| 28 | 0.028 | — | — |
| 30 | 0.029 | — | — |

The He leakage amount was measured by supplying He gas (9 atm) to the outside of the hydrogen separation membrane, and measuring the amount of He gas that leaked from the hydrogen separation membrane.

Examples 2 and 3

A hydrogen separation membrane was formed in the same manner as in Example 1, except that the amount of copper forming the palladium alloy was changed as shown in Table 1. A hydrogen separator was produced using the resulting hydrogen separation membrane. The measurement results of the hydrogen permeation test are shown in Table 1.

Comparative Example 1

A hydrogen separation membrane was formed in the same manner as in Example 1, except that only palladium was used as the material for the hydrogen separation membrane. A hydrogen separator was produced using the resulting hydrogen separation membrane. The measurement results of the hydrogen permeation test are shown in Table 1. The hydrogen separator of Comparative Example 1 was subjected to the durability test in the same manner as in Example 1, and the amount of He that leaked from the hydrogen separation membrane was measured. The measurement results are shown in Table 2. In Comparative Example 1, the amount of He that leaked from the hydrogen separation membrane increased to a large extent in the second cycle. Therefore, the subsequent measurement was omitted.

Comparative Example 2

A hydrogen separation membrane was formed in the same manner as in Example 1, except that an alloy of palladium and silver was used as the material for the hydrogen separation membrane. A hydrogen separator was produced using the resulting hydrogen separation membrane. Palladium and silver were deposited so that the amount of silver was 25 parts by mass with respect to 100 parts by mass of palladium. The measurement results of the hydrogen permeation test are shown in Table 1. The hydrogen separator of Comparative Example 1 was subjected to the durability test in the same manner as in Example 1, and the amount of He that leaked from the hydrogen separation membrane was measured. The measurement results are shown in Table 2. In Comparative Example 2, the amount of He that leaked from the hydrogen separation membrane increased to a large extent in the twenty-sixth cycle. Therefore, the subsequent measurement was omitted.

Figure 4:
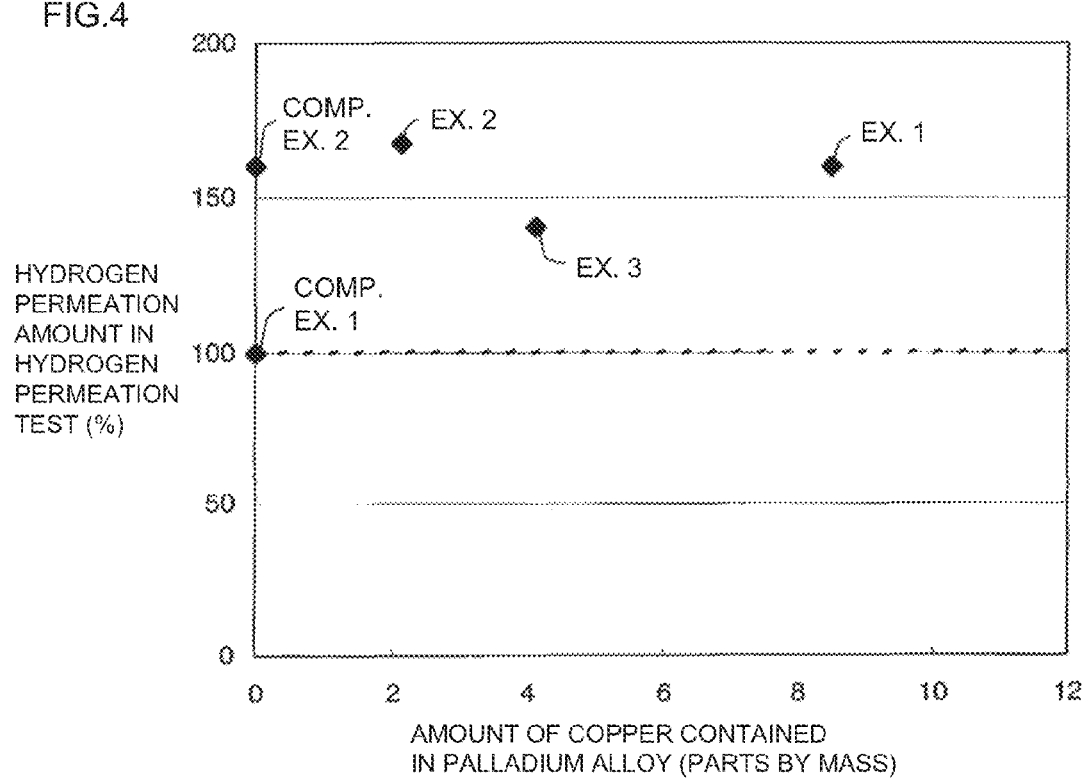
FIG. 4 is a graph showing the measurement results of a hydrogen permeation test conducted on hydrogen separation membranes used for hydrogen separators of Examples 1 to 3 and Comparative Examples 1 and 2.

FIG. 4 is a graph showing the measurement results of the hydrogen permeation test conducted on the hydrogen separation membranes used for the hydrogen separators of Examples 1 to 3 and Comparative Examples 1 and 2. The horizontal axis indicates the amount (parts by mass) of copper contained in the palladium alloy, and the vertical axis indicates the measurement result that is indicated by the percentage with respect to the amount of hydrogen that passed through the hydrogen separation membrane in the hydrogen permeation test in Comparative Example 1 (hydrogen separation membrane formed of palladium) (=100%).

Figure 5:
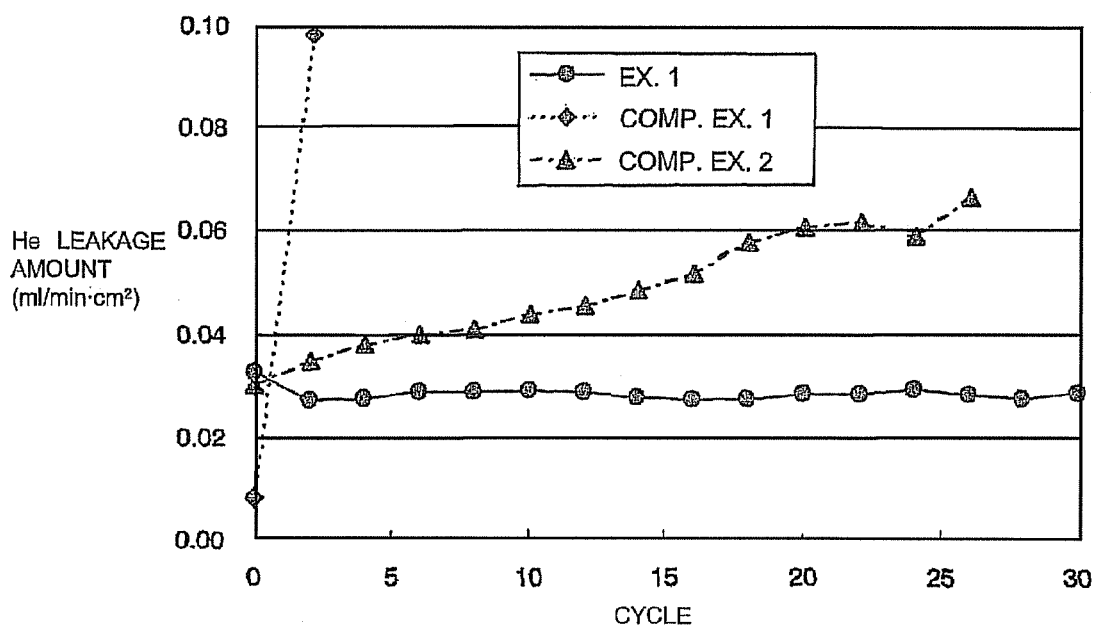
FIG. 5 is a graph showing the measurement results for the leaked amount of He of Example 1 and Comparative Examples 1 and 2 in a durability test. a5

FIG. 5 is a graph showing the measurement results for the amount of He that leaked from the hydrogen separation membranes of Example 1 and Comparative Examples 1 and 2 in the durability test. The horizontal axis indicates the cycle of the durability test, and the vertical axis indicates the He leakage amount (ml/min·cm$^2$).

Examples 4 to 10

A hydrogen separation membrane was formed in the same manner as in Example 1, except that the ratio of the elements forming the palladium alloy was changed as shown in Table 3. A hydrogen separator was produced using the resulting hydrogen separation membrane. The measurement results of the hydrogen permeation test of Examples 2 and 4 to 10 are shown in Table 3.

TABLE 3

| | Composition of palladium alloy (parts by mass) | | | Results of hydrogen permeation test (%) |
|---|---|---|---|---|
| Example 2 | Palladium (100) | silver (25) | Copper (2) | 167 |
| Example 4 | Palladium (100) | silver (25) | Nickel (2) | 145 |
| Example 5 | Palladium (100) | silver (25) | Cobalt (2) | 140 |
| Example 6 | Palladium (100) | silver (25) | Iridium (2) | 150 |
| Example 7 | Palladium (100) | silver (25) | Rhodium (2) | 168 |
| Example 8 | Palladium (100) | Gold (5) | Cobalt (2) | 85 |
| Example 9 | Palladium (100) | Gold (5) | Iridium (2) | 96 |
| Example 10 | Palladium (100) | Gold (5) | Rhodium (2) | 95 |

(Results)

As shown in Table 1 and the graph of FIG. 4, the hydrogen separation membranes used for the hydrogen separators of Examples 1 to 3 exhibited excellent hydrogen permeability.

Regarding the measurement results for the He leakage amount in the durability test, the hydrogen separator of Example 1 did not show an increase in He leakage amount after 30 cycles (i.e., exhibited excellent durability). The hydrogen separators of Comparative Examples 1 and 2 showed an increase in He leakage amount as the number of cycles increased.

As is known from the results shown in Table 3, the hydrogen separation membranes used for the hydrogen separators of Examples 2 and 4 to 10 had a hydrogen permeability equal to or more than 50% of the hydrogen permeability of the hydrogen separation membrane formed of pure palladium. The hydrogen separators of Examples 2 to 10 did not show an increase in He leakage amount in the durability test (30 cycles). It was confirmed that the durability of the hydrogen separators of Examples 2 to 10 was improved as compared with the hydrogen separator of Comparative Example 1.

Industrial Applicability

The hydrogen separation membrane according to the present invention may be suitably utilized in various industrial fields that require high-purity hydrogen. For example, it may be suitably utilized in the field of fuel cells that utilize hydrogen obtained by reforming hydrocarbons (e.g., methane or propane) as fuel gas. The selectively permeable membrane reactor according to the present invention may be utilized as a reactor that produces hydrogen from a raw material gas.

The invention claimed is:

1. A hydrogen separation membrane comprising a palladium alloy that includes at least palladium, an added metal A, and an added metal B, the added metal A and the added metal B being two different metals other than palladium,
   each of the added metal A and the added metal B forming a complete solid solution with palladium, and the added metal A and the added metal B having a triple point in an equilibrium diagram and not forming an intermetallic compound,
   wherein the palladium alloy has been heat treated at a temperature within ±100° C. of the triple point of the added metal A and the added metal B in the equilibrium diagram,
   wherein the content of palladium in the palladium alloy is 60 to 90 mass %, and
   wherein the added metal A is silver and the added metal B is copper.

2. The hydrogen separation membrane according to claim 1, the hydrogen separation membrane having a thickness of 0.1 to 10 μm.

3. A hydrogen separator comprising:
   a porous substrate that contains a ceramic or a metal as a main component and has a plurality of pores formed from a first surface to a second surface of the porous substrate; and
   the hydrogen separation membrane according to claim 1 that is disposed on the first surface of the porous substrate.

4. A selectively permeable membrane reactor comprising:
   a reaction tube, one end of the reaction tube being a gas inlet and the other end of the reaction tube being a gas outlet;
   a separation tube that is inserted into the reaction tube and includes a selectively permeable membrane that selectively allows hydrogen to pass through on its surface; and
   a catalyst that is disposed between the reaction tube and the separation tube and promotes a reaction for producing hydrogen from a raw material gas,
   the selectively permeable membrane being the hydrogen separation membrane according to claim 1.

5. The selectively permeable membrane reactor according to claim 4, wherein the catalyst is supported on a support formed in the shape of pellets, a foam, or a honeycomb, or formed in the shape of pellets, a foam, or a honeycomb.

* * * * *